United States Patent
Lester et al.

(10) Patent No.: US 9,293,918 B2
(45) Date of Patent: Mar. 22, 2016

(54) POWERLINE PULSE POSITION MODULATED THREE-PHASE TRANSMITTER APPARATUS AND METHOD

(71) Applicants: Marshal Lester, Northridge, CA (US); Ron Fienberg, Mandeville, LA (US); Preston Lane, Eugene, OR (US)

(72) Inventors: Marshal Lester, Northridge, CA (US); Ron Fienberg, Mandeville, LA (US); Preston Lane, Eugene, OR (US)

(73) Assignee: Powerline Control System, Inc., Northridge, CA (US)

( * ) Notice: Subject to any disclaimer, the term of this patent is extended or adjusted under 35 U.S.C. 154(b) by 661 days.

(21) Appl. No.: 13/659,862

(22) Filed: Oct. 24, 2012

(65) Prior Publication Data

US 2014/0225436 A1    Aug. 14, 2014

(51) Int. Cl.
*H02J 3/00* (2006.01)
*H02J 13/00* (2006.01)
*H05B 37/02* (2006.01)
*H04B 3/54* (2006.01)
*H04B 14/02* (2006.01)

(52) U.S. Cl.
CPC ............... *H02J 3/00* (2013.01); *H02J 13/0024* (2013.01); *H04B 3/54* (2013.01); *H04B 14/026* (2013.01); *H05B 37/0263* (2013.01); *H04B 2203/5416* (2013.01); *H04B 2203/5466* (2013.01); *Y10T 307/297* (2015.04)

(58) Field of Classification Search
CPC ............................................. H04B 2203/5429
USPC .......................................................... 307/17
See application file for complete search history.

(56) References Cited

U.S. PATENT DOCUMENTS

| | | | | | |
|---|---|---|---|---|---|
| 5,257,006 | A | * | 10/1993 | Graham | H04B 3/54 307/11 |
| 5,263,027 | A | * | 11/1993 | Sakaguchi | H04B 3/542 327/100 |
| 6,549,120 | B1 | * | 4/2003 | de Buda | H04B 3/54 370/203 |
| 2003/0043027 | A1 | * | 3/2003 | Carson | H04B 3/54 375/259 |
| 2008/0258882 | A1 | * | 10/2008 | Lester | H04B 3/54 375/259 |

\* cited by examiner

*Primary Examiner* — Rexford Barnie
*Assistant Examiner* — Daniel Kessie
(74) *Attorney, Agent, or Firm* — Lewis Brisbois; Bisgaard & Smith LLP; Jon E. Hokanson

(57) ABSTRACT

An electrical control system consisting of two or more electrical transmitting devices each capable of transmitting synchronized messages consisting of electrical pulses to devices connected to one or more of the three phases of the AC power lines in a typical three phase power system. The synchronized transmitters are each connected to neutral and to one or more of the three phases, A, B, and C, or across two of the phases, of different circuit breaker panels in a typical three phase power system, and are capable of transmitting messages to one or more of the three phases. The transmissions from the two or more transmitters are synchronized such that the transmitted pulses from each transmitter are transmitted at the same time to produce a message that can be received correctly at any receiving device connected to any of the connected circuit breaker panels.

16 Claims, 20 Drawing Sheets

The GreenWorx Network Extender (GNX) IC

The GreenWorx Network Node (GNN) IC

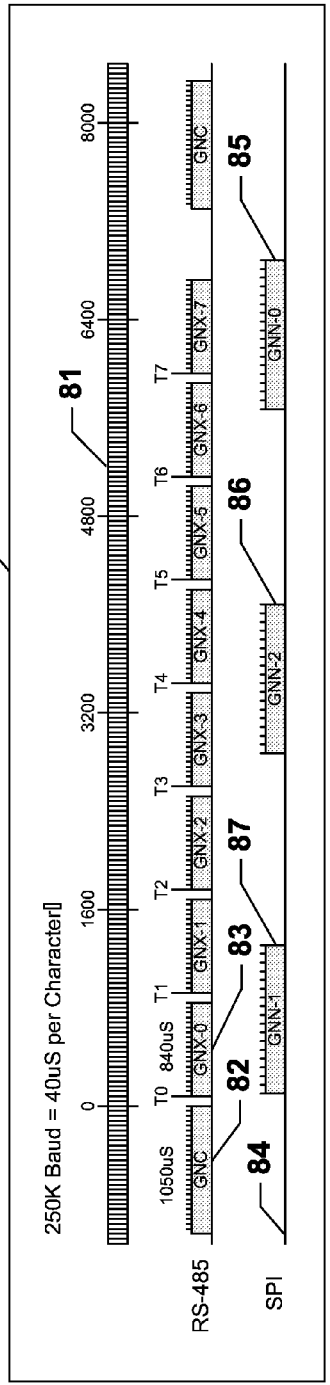
Figure 14A
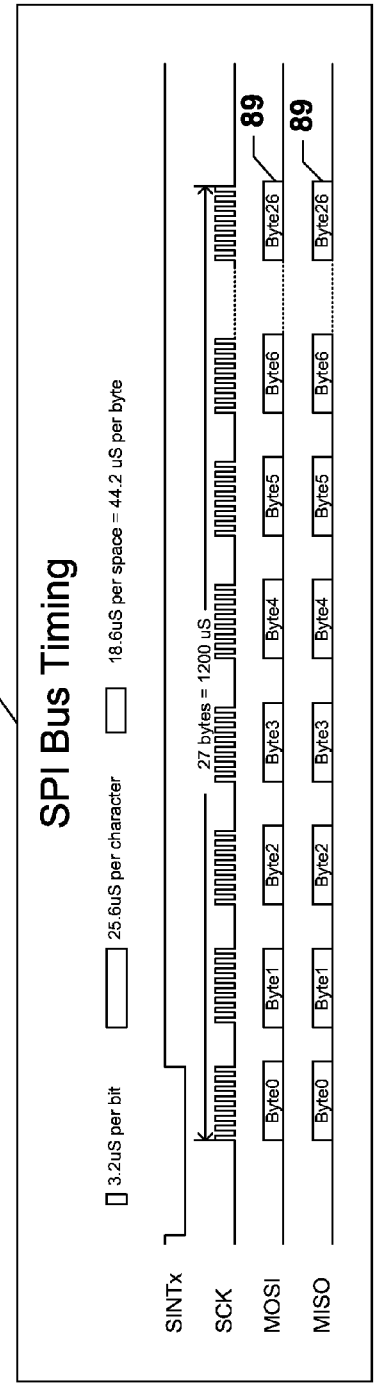
Figure 14B
Figure 14

POWERLINE PULSE POSITION MODULATED THREE-PHASE TRANSMITTER APPARATUS AND METHOD

FIELD OF THE INVENTION

This invention is directed to an apparatus which enables the transmission and reception of digital communication from and to one or more devices wherein each of the devices is connected to at least the one of the phases of a three-phase power system and use the same three-phase power system as a physical channel for the digital intercommunication.

BACKGROUND OF THE INVENTION

Many electrical devices may be more conveniently used if they can be remotely controlled. For example, in an industrial application, such devices are mostly HVAC and lighting loads. The HVAC and lighting loads may be remotely controlled for a number of different reasons. For energy conservation reasons, some lights may be controlled by a timer. In other cases, different lighting intensity and different lighting distribution may be desirable in a single building zone, depending upon its use. Each application suggests a different lighting level and different lighting distribution and they can vary over time, due to changes in seasons and changes in daylight in a given location. Normally, changes in the control of lighting levels, distribution and timing is not done, or done very infrequently because it is inconvenient or impossible to do so with conventional control systems. Often in retrofit applications the wiring does not allow for controlling separate zones and/or lighting levels and the cost of rewiring is often prohibitive. Therefore, it is desirable to have a convenient, reliable way to remotely control individual loads or groups of loads in commercial/industrial lighting systems.

In addition to lighting systems, other devices can be conveniently remotely controlled. For example, powered gates and doors can be remotely controlled. Powered window coverings may be opened and closed, depending upon available day-lighting. Air conditioners or evaporative coolers can be activated depending on the need instead of by the circuit to which they are connected.

As electronic technology has advanced, inventors have produced a variety of control systems capable of controlling lighting and other electric loads. In order to be useful as an industrial lighting control system, there are certain requirements that must be met. A system must permit both small and large groups of lights to be controlled on command. One problem relates to the connection and communication between the controller and the lighting or HVAC loads. Most conventional connections are currently hard-wired, and trying to reconfigure the control for increased efficiency can be very complex and prohibitively expensive. Another disadvantage of any hard-wired system is that it may be very costly to change the configuration if the use pattern changes. For example, a manufacturing plant may change the configuration of its production zone layout every few years. Depending on how the different lighting zones are initially wired it may be impossible to match the old lighting zones to the new production zones thereby requiring all lights to be left on 24 hours a day using energy unnecessarily. Also, conventional, radio frequency type connection systems are known, but they have proven difficult to implement because of a combination of high noise and high attenuation found in the industrial environment and the fact that the FCC requires low signal levels. Low signal levels are subject to interference and the transmission and receiving circuitry for this type of control system is complex and relatively expensive. At present, there is no known widely deployed wireless industrial lighting control system.

In an electrical distribution system, both the controller or interface device and the load to be controlled are connected to the same powerline electrical distribution system. It therefore would be useful to use the powerline as the communication-connecting channel or means. Known, prior powerline communication systems have had difficulties employing the powerline as a communication channel because, once attenuated by the powerline circuitry, the communication signals are very small compared to the background noise. This is particularly true in the commercial/industrial three-phase environment. As is well known, between certain locations in an industrial electrical system application there will be very high attenuation of any transmitted signals. As is also well known, it has been difficult to reliably separate the highly attenuated communication signals from the background noise on the powerline, particularly in such locations.

The above-describe attenuation problem is further aggravated and complicated by the constant and unpredictable nature of changes in the noise and signal attenuation in the powerline. These changes result as various loads are connected and disconnected both inside the breaker panel to which the loads are connected and inside any of the many neighboring circuit breaker panels attached to the same mains power transformer. The noise problem has recently become much worse due to the widespread introduction of Variable Speed Drives used for controlling HVAC equipment. These drives are significant noise generators, particularly in the commercial/industrial environment. Finally, communication of control signals through the powerline circuit used for communication in an industrial application is further complicated and hindered because in the industrial environment the powerline includes all of the circuit breaker panels and loads attached to the mains power transformer. No known, practical way is available to avoid these complications.

SUMMARY OF THE INVENTION

In order to aid in the understanding of the present invention, it can be stated in essentially summary form that it is directed a specialized repeating device consisting of multiple transmitter and repeater circuits connected to different phases of a multiple phase power system and method to enable powerline pulse position modulated communication.

The basic concept is that this repeating system is connected to all three phases, A, B, and C, of a typical three phase system, and is capable of both receiving a message from any device attached to any of the three phases and can also transmit outgoing messages virtually simultaneously to all three phases. Because of the nature of the timing characteristics of the pulse position modulated system used in this system, the three separate phases are completely independent communication channels and in no way can be passively coupled to enable communication across phases. The only possible method of communicating from one phase to all three phases is with the use of this active, three phase repeating device that is the subject of this invention.

Not only does this device solve the problem of communicating across multiple phases but the repeated transmissions result in a very robust signal pulse even after significant attenuation.

The presently described system includes a specific embodiment of a transmitting system and operation to derive transmission signals that are effective in the industrial three-phase environment. Several single phase transmitter circuits are described in U.S. patent application Ser. No. 12/055,133, and entitled "POWERLINE CONTROL SYSTEM AND METHOD" which is related to and claims priority on U.S. provisional application 60/912,420, filed Apr. 17, 2007; U.S. Pat. No. 6,734,784, issued May 11, 2004, and entitled "ZERO CROSSING BASED POWERLINE PULSE POSITION MODULATED COMMUNICATION SYSTEM" ("the '784 patent"); U.S. Pat. No. 6,784,790, entitled ASYNCHRONIZATION REFERENCE PULSE BASED POWERLINE PULSE POSITION MODULATED COMMUNICATION SYSTEM, issued Aug. 31, 2004, ("the '790 patent"); and U.S. Pat. No. 7,265,654, entitled POWERLINE PULSE POSITION MODULATED TRANSMITTER APPARATUS AND METHOD, issued Sep. 4, 2007, ("the '654 patent"), all three of which patents are incorporated by reference herein.

It is a purpose and advantage of the present invention to provide a method and apparatus for reliable transmission of digital data over the powerline in a three-phase power system by means of a pulse position modulated three-phase repeater apparatus and method utilizing an active repeating system.

It is a further purpose and advantage of the present invention to provide a method and apparatus for powerline pulse transmission wherein the voltage zero crossing is sensed and the communication signal pulse is transmitted and sensed in a receiver based on the signal position relative to either the zero crossing point or the position of one or more previous transmitted synchronization pulses.

It is a further purpose and advantage of the present invention to provide a method and apparatus by a powerline pulse position modulation transmission method for the purpose of remote electrical load control.

It is a further purpose and advantage of this invention to provide a method and apparatus wherein the voltage zero crossing is sensed and digital pulse windows are defined with respect to the zero voltage crossing, but spaced from the zero voltage crossing so as not to interfere with zero voltage crossing equipment.

It is a further purpose and advantage of the present invention to provide a pulse position modulated three-phase repeater apparatus and method for the purpose of remotely retrieving operational data from industrial and commercial sensors.

It is a further purpose and advantage of the present invention to provide a pulse position modulated three-phase repeater apparatus and method for the purpose of remotely controlling industrial and commercial loads for utility company energy management.

It is a further purpose and advantage of the present invention to provide a pulse position modulated three-phase repeater apparatus and method for the purpose of saving energy in lighting systems in the industrial and commercial environment by enabling retrofittable distributed control of lighting fixtures.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 14A and 14B are timing diagrams for communication from the network nodes to the network extenders of the present invention.

DETAILED DESCRIPTION

The purpose of the powerline pulse position modulated communication transmitter apparatus of this invention as shown in FIGS. 1-20 is to enable the communication of digital data from one device to another by means of the powerline to which both devices are connected. A further purpose is to enable communication to control lighting or other electrical loads in one or more rooms of a building.

Figure 1:
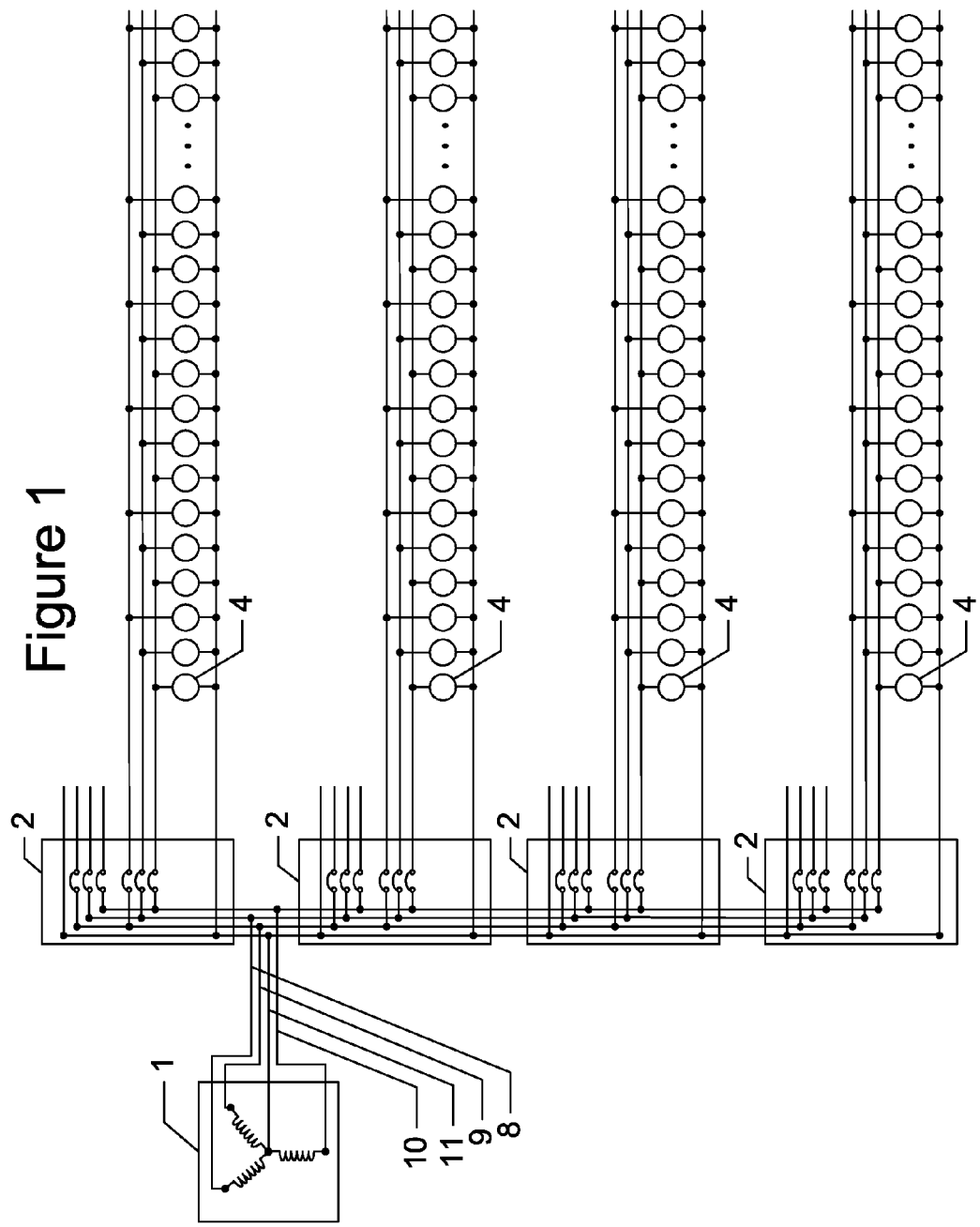
FIG. 1 is a diagram of a typical, prior art lighting system without controls.

FIG. 1 is a Block Diagram of a Typical Lighting System without Controls

FIG. 1 is a schematic diagram of a typical industrial lighting system with no controls installed. On the left is of the FIG. 1 is a three-phase transformer 1. This transformer is a Y type transformer. There are shown four separate circuit breaker panels 2 all fed from the same power transformer. Each panel 2 could be a 200 A or 400 A three-phase panel supplying 277V power. The small circles in this diagram represents lighting fixtures 4 which are dispersed throughout the building attached between neutral wire 11 and one of the three phases A 8, B 9, or C 10. In a typical system such as this system in FIG. 1 the method of control used in the past would be with some type of contactor panel. A contactor panel is a separate panel consisting of large circuit breakers that control one or more circuits. These large contactors or relays are only capable switching on or off an entire circuit with all the fixtures connected to that circuit being turned on or off simultaneously. The concept that a contactor panel can only turn on or off an entire circuit has the limitation that there is no way to make zones or different levels within zones or different scenes within zones or lighting zones within a factory or warehouse or distribution center or any high bay building. In order to achieve maximum energy savings a lighting system must be able to be tailored to the needs of the user such that different zones can be defined within a high bay building and those zones controlled in order to produce the light levels necessary. Some zones may be used more than other zones and some zones may not be used at all. Some zones may be subject to significant daylighting and some zones may not have any daylighting. In order to minimize energy use and maximize savings the lighting system must be able to control different zones of fixtures even though those zones may not be wired correctly to separate them into the desired zones.

Figure 2:
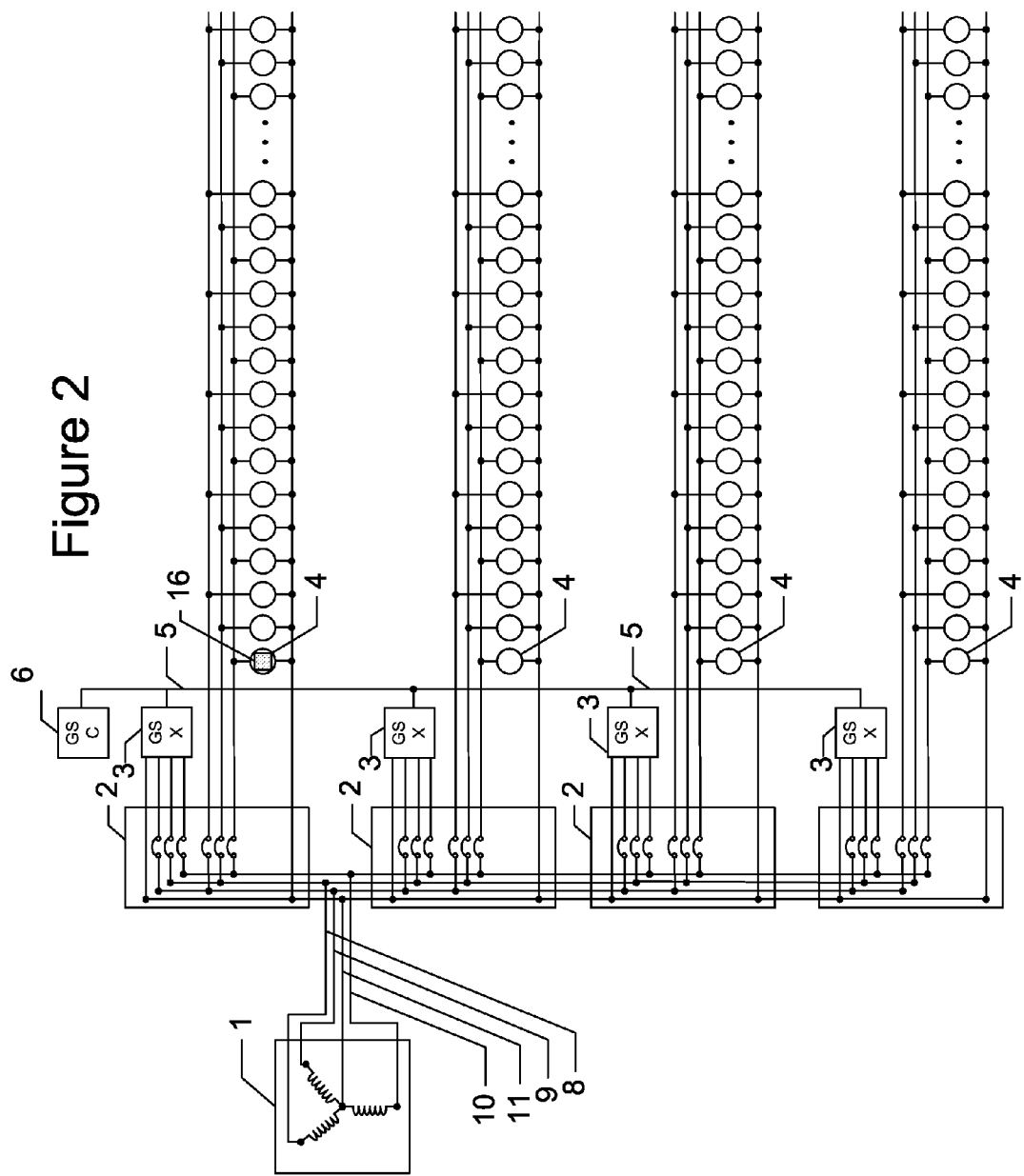
FIG. 2 is a diagram of a first alternate embodiment of the present invention including a typical lighting system with controls and only one transformer.

FIG. 2 is a is a Block Diagram of a Typical Lighting System with Controls and Only One Transformer FIG. 2 is basically the same schematic diagram of an industrial lighting system as FIG. 1 except with the addition of a lighting control system embodiment as described in the current application. In FIG. 2 is shown the same three-phase transformer 1, the four separate circuit breaker panels 2 and the multitude of lighting fixtures 4. In addition to these components the two basic components of the Lighting control system described in the current application are shown. The lighting control system described in the current application includes system extenders 3, referred to as (GSX) that are attached to each of the circuit breaker panels. One GSX 3 of the lighting control system described in the current application is connected to all three phases and neutral of each of the circuit breaker panels. This is shown as Phase A 8, B 9, C 10, and Neutral 11 in FIG. 2.

A lighting control system described in the current application is capable of transmitting individually into all three phases of a circuit breaker panel and also of receiving communication from all three phases of the circuit breaker panel. Each GSX is connected to the three-phase A, B and C wires. Inside each GSX there is a separate transmitter and receiver for each of the three phases of the three-phase power distribution system. Also shown in FIG. 2 is the lighting control system component described in the current application, referred to as the system controller 6, (GSC) and which is basically the brain of this system.

In FIG. 2 is shown a low voltage, three wire, RS485 communication channel 5. This RS485 communication bus is a set of wires that connects the GSC the system controller to up to eight GSX units which are referred to as the System Extenders. The GSC is the main brain of the system. The GSX units are effectively transmitting, receiving slave units that are the actual connections to the three phases power wires in the circuit breaker panels of the power system. The RS485 communication circuit 5 allows the GSC 6 to be in constant communication with up to eight GSX units 3 simultaneously.

Therefore the heart of the lighting control system described in the current application is one GSC controller connected to at least one but up to eight GSX system extenders. The number of GSX extenders needed in a system depends on how many circuit breaker panels are connected to the lighting fixtures in a building. Typically the building will have one, two, or three circuit breaker panels controlling the lighting. The lighting control system described in the current application allows for up to eight individual separate circuit breaker panels connected to the wiring.

In FIG. 2 are shown as small circles representing the lighting fixtures 4 to be controlled. Also shown in FIG. 2, as part of the lighting control system described in the current application is one fixture control module 16 installed inside of each fixture to be controlled. Therefore all the fixtures 4 shown must each contain one fixture control module 16 which is capable of receiving and transmitting signals, commands and messages from the lighting control system described in the current application. The basic concept of the lighting control system described in the current application is that the GSC, the main brain of the system, through the GSX System Extenders, is capable of sending messages simultaneously to each and every fixture control module 16 in the system. Therefore the fixture control modules 16 installed in the fixtures 4 are capable of being preprogrammed and arranged into different zones with scenes and lighting levels. The main controller GSC 6 is capable of turning different zones on and off or up and down to high levels, medium levels, or low levels or to different scenes based on schedules or manual control or occupancy sensors or photo sensors.

Figure 3:
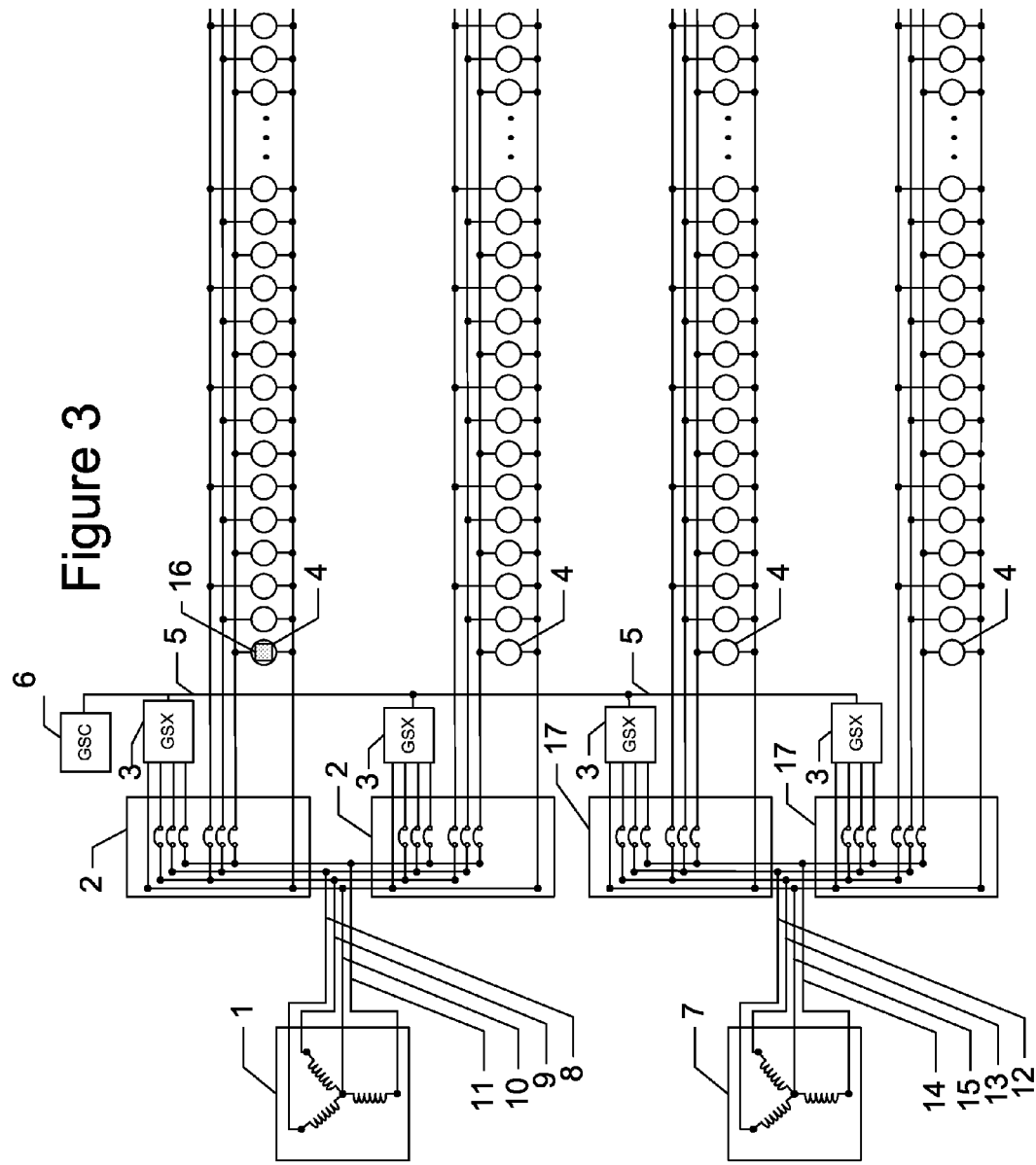
FIG. 3 is a diagram of a second alternate embodiment of the present invention including a typical lighting system with controls and two transformers.

FIG. 3 is a Block Diagram of a Typical Lighting System with Controls and Two Transformers FIG. 3 shows the same lighting control system as FIG. 1 and FIG. 2 with one primary difference, this lighting control system is fed by two individual separate transformers 1 and 7. It is possible that a building be fed by more than one power transformer. In FIG. 3 two different three-phase Y-type transformers feeding different parts of the lighting system in this building are shown. The top transformer 1 feeds both circuit breaker panels 2, which feed the first half of the lighting system in this building. The lower transformer 7 feeds the bottom to circuit breaker panels 17 which feed the second half of the lighting system in this building.

The lighting control system described in the current application design allows that system extenders be connected to circuit breaker panels that are fed from different transformers. Therefore one system controller 6 in FIG. 3 is capable of controlling multiple lighting control system fixtures 4 described in the current application extenders even if they are connected to circuit breaker panels 2, 17 fed by different transformers 1,7. Each system extender is capable of transmitting messages into the circuit breaker panel and receiving messages from the devices or fixture control models that are installed in the fixtures connected to that circuit breaker panel. The question may come up, why do you need two system extenders on two different circuit breaker panels that are fed from the same transformer?

One may think that one system extender GSX 3 attached to one circuit breaker panel 2 should be able to transmit and receive into that circuit breaker panel and also connect the signals go to all other circuit breaker panels attached to the same transformer. It was found that this is not a very reliable design. It turns out that the signals going into one circuit breaker panel into the bus on the transformer and off to another circuit breaker panel may be attenuated so severely in an industrial power system that by the time they get to the second or third or fourth circuit breaker panel the communication is so attenuated it is not reliable. In the lighting control system described in the current application design we allow for one GSX system extender attached to every single circuit breaker panel 2 and 17 to ensure reliability. Even if the coupling between multiple circuit breaker panels is poor the installation of one system extender on each and every circuit breaker panel ensures maximum reliability of the system. It is very important that an industrial lighting control system be extremely reliable. Our current design allows for proper communication to the lighting fixtures on multiple circuit breaker panels whether the coupling between the individual panels is very good or very poor. Since one GSX is attached to each circuit breaker panel we can obtain very reliable communication to all devices powered by that circuit breaker panel.

One key feature of this invention is that the communication signals produced by multiple GSX units must be synchronized perfectly as to the timing of the signals that are transmitted out into the devices attached to their respective circuit breaker panels. Because the signal coupling of signals between one GSX attached to a first circuit breaker panel and the powerlines on a second circuit breaker panel may be very good those signals may proliferate to the fixture control modules of both the first and the second panel. The signals from the second GSX may be mixed very well with the signals produced by the first GSX. If those signals are not synchronized together extremely well those signals could mix in a way that destroys the message. Therefore one key component of this invention is that all GSX units along with the GSC controlling them must produce messages where the transmission pulses are perfectly synchronized as they enter the powerline system. If they were not synchronized perfectly those messages would be mixed together and destroy each other such the communication would be impossible or very unreliable. Once again a key part of this invention is the concept that the entire system must produce synchronized messages leaving the GSX system extenders such that the messages are completely synchronized and the messages leave all the GSX units simultaneously.

Figure 4:
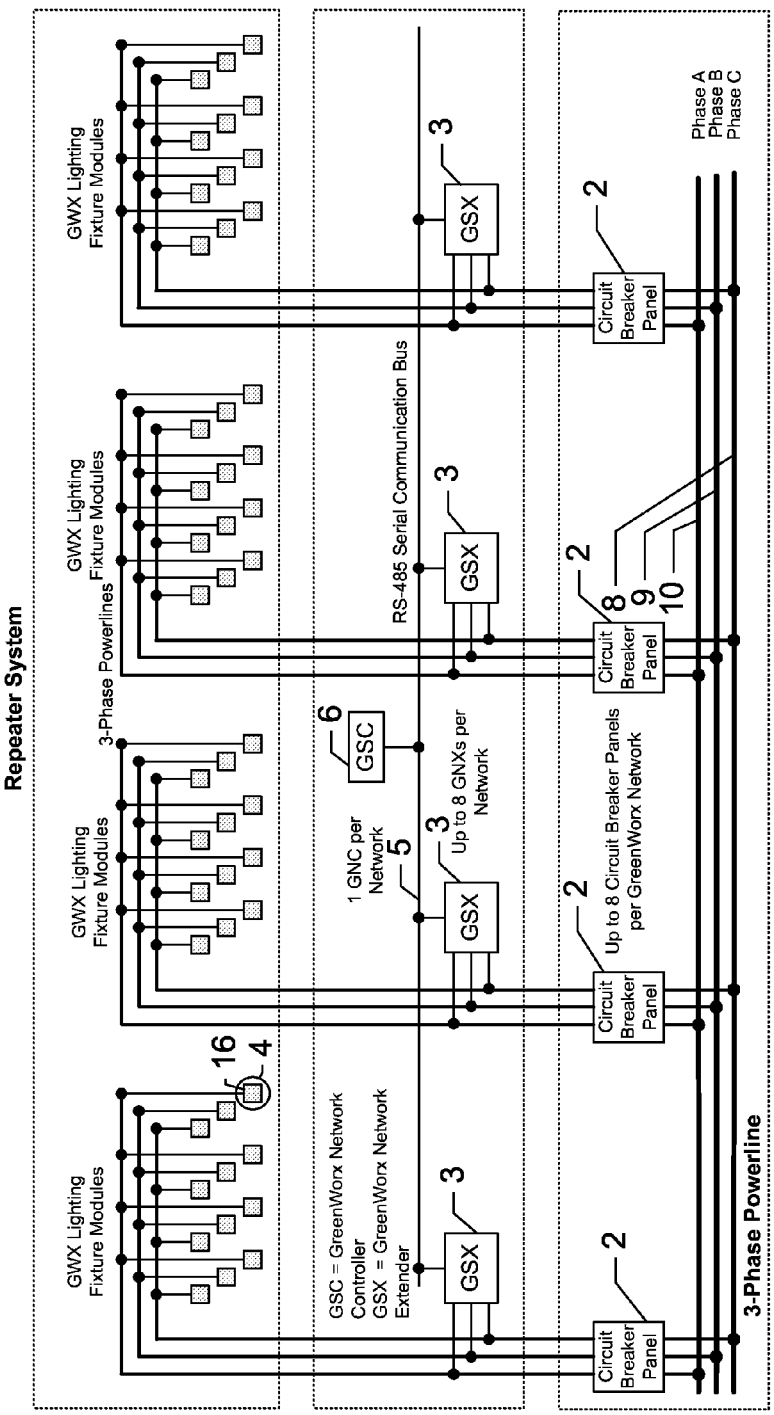
FIG. 4 is a diagram of a lighting system controller embodiment of the present invention.

FIG. 4 is a GNC System Block Diagram

FIG. 4 is another representation of the lighting control system described in the current application. In the middle of FIG. 4 there is one GSC 6 or lighting control system described in the current application controller. FIG. 4 shows that there is one GSC 6 per network. One GSC can effectively control up to eight GSX 3 units. FIG. 4 shows four circuit breaker panels 2 where each circuit breaker panel is connected to one GSX unit. In FIG. 4 we do not show a neutral wire but we show Phase A 8, Phase B 9 and Phase C 10. We also do not show the power transformer. It is assumed that phase A, phase B and phase C come from a three-phase y-type transformer. Three-phase power enters each circuit breaker panel and each circuit breaker panel connects to the lighting fixtures 4 shown at the top of FIG. 4. The lighting fixtures are more or less evenly distributed on the three separate phases. This is always the case because the load of the transformer needs to be balanced. Inside each lighting fixture is a fixture control module 16 capable of receiving and transmitting messages to the system controller GSC. Again this is a simple representation of a typical lighting control system described in the current application showing one GSC and up to eight GSX units. One crucial piece is the RS485 serial communication bus 5 shown connected between the GSC and all GSX units. In the hardware of the current implementation of the lighting control system described in the current application the RS485 is provided by Cat 3 or Cat 5 Ethernet communication wire. This is low-voltage wire completely isolated from the high-voltage of the lighting system. Each GSX is connected from one GSX to another GSX to another GSX with the daisy chain of Cat 3 or Cat 5 Ethernet communication cable. The RS485 line can be up to 4000 feet long connecting multiple GSX units. 4000 feet is completely adequate for a normal high-bay building lighting system. We have not seen any lighting control system such that the circuit breaker panels are more than 4000 feet apart. Typically they are next to each other or only several hundred feet apart.

Figure 5:
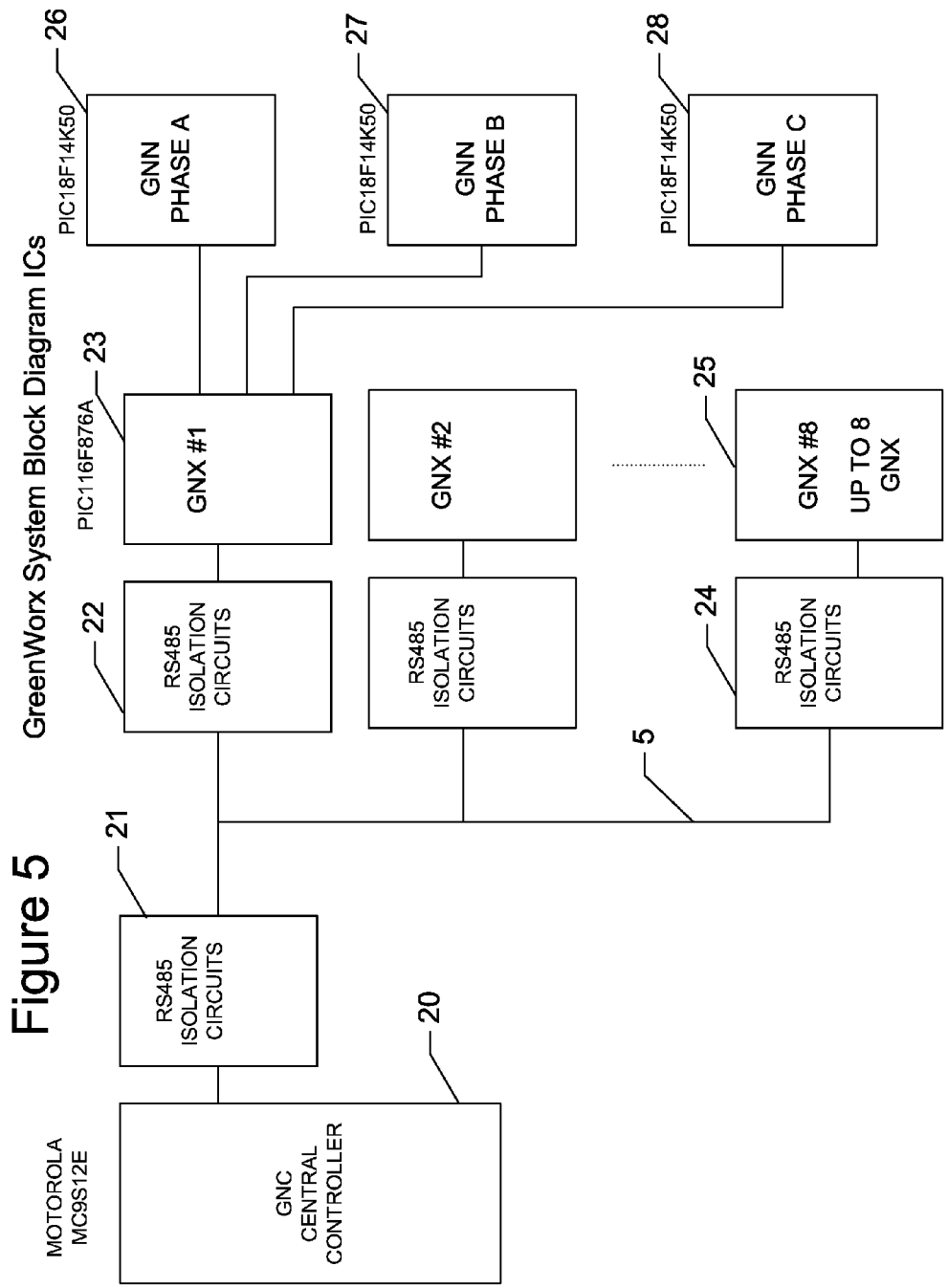
FIG. 5 is a block diagram of an embodiment of the present system invention showing all major integrated circuits.

FIG. 5 is a Block Diagram Showing all the Major ICs.

FIG. 5 is a block diagram of the lighting control system described in the current application showing the main integrated circuits that are part of the GNC 6 and the GNX 3. Once again the complete control system in the lighting control system described in the current application is made up of one GNC 6 central controller and up to 8 GNX 23, 25 units. Now we will follow the chain of communication between the GNC central controller and the powerline. Let us suppose that a command is produced within the GNC 6 central controller from the part of the GNC central controller that is the time scheduler. Say it's a certain day, Monday, eight in the morning and we wish to send a command on the powerline to turn the lights off.

The command starts in the GNC 20 and is transmitted over the RS485 bus 5 to the GNXs, 23, 25 up to eight GNX units simultaneously. Because the GNC must be isolated from the GNX units there are isolation circuits 21, 22, 24 shown in FIG. 5 in both the GNC circuit board and the GNX circuit boards. But the communication, the command, from the GNC is sent to all GNX units simultaneously. The GNC central controller in the current best implementation of this invention consists of a Motorola MC9S12E processor 20. This is the most sophisticated microprocessor in our system. This is the most powerful microprocessor in our system.

The GNX's boards have one main integrated circuit 23 on each board that communicates with the GNC central microprocessor 20. These integrated circuits are made by Microchip. These GNX microprocessors are the type PIC16F876A 23. Each GNX unit has one PIC16F876A 23 microprocessor. These microprocessors receive the command from the GNC central controller by means of the RS485 bus 5. When the PIC16F876A 23 microprocessor receives the message it in turn sends the message to three other integrated circuits on the GNX circuit board which we call the Nodes 26, 27, 28 or Lighting control system described in the current application Network Node (GNN) integrated circuits.

Our abbreviation for the lighting control system described in the current application network node is GNN 26, 27 and 28. The GNN integrated circuit is a PIC18F14K50 microprocessor. The reason there are three individual GNN 26,27,28 integrated circuits on the GNX circuit board are because each GNN 26,27,28 integrated circuit transmits and receives signals from only one phase of the powerline. So once again the chain of communication is as follows. First a command starts with the GNC central controller 20 then the communication is put onto the RS485 bus to all the GNX's 23 to 25 that are present and lastly the GNX send the command to each of the GNN ICs 26,27,28 that control the transmitting and receiving on each phase of the powerline.

Also shown in FIG. 5 are the isolation circuits 21 22 that keep the power supply of the GNC central controller 20 completely isolated from the power supplies of the individual GNX 23 to 25 units which are each powered from a separate circuit breaker panel. It is essential that these GNX units are all isolated power supplies completely isolated from one another as the neutrals and the ground for each of these circuit breaker panels and circuit boards will be at different voltages. Another important reason to isolate the circuit boards of the different GNX units and a central controller is that if one GNX should fail with some sort of short to ground or high-voltage problem then it will not destroy the rest of the system and the rest of the communication.

Figure 6:
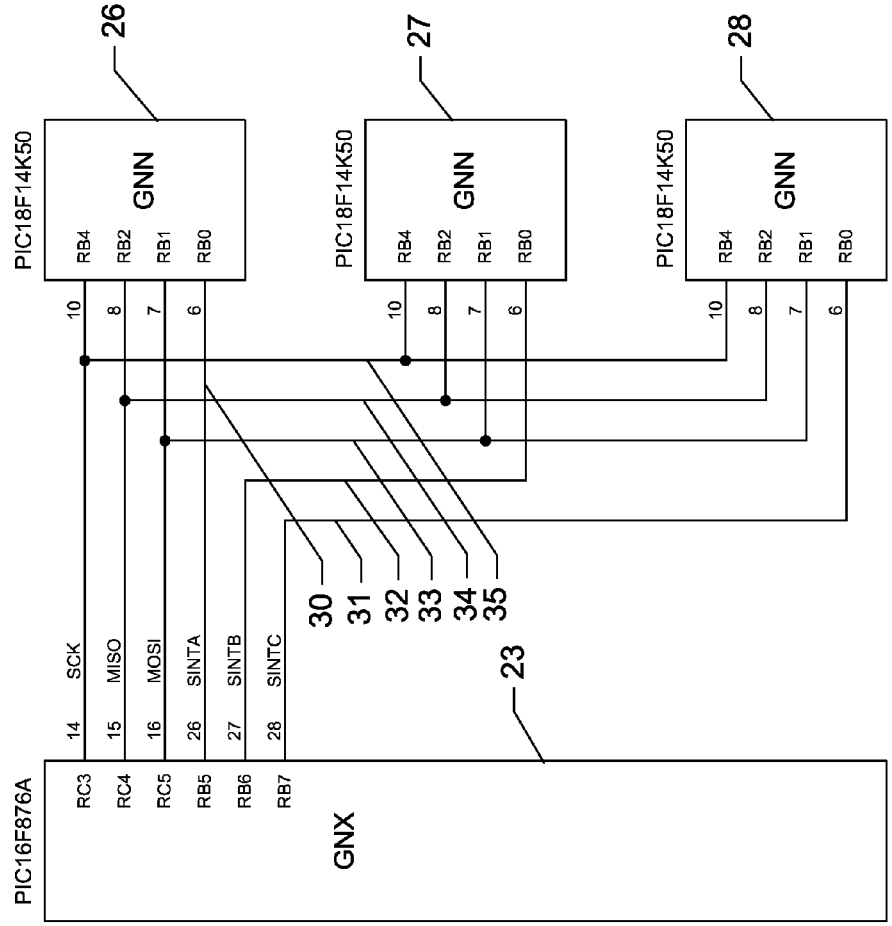
FIG. 6 is a diagram of an embodiment of a network extender bus embodiment of the present invention.

FIG. 6 Shows the Lighting Control System Described in the Current Application Network Extender SPI Bus.

FIG. 6 shows the actual connections between the GNX integrated circuit 23 and the three GNN 26, 27, 28 integrated circuits. In FIG. 5 this connection is shown as a single line connecting the GNX with the 3 GNN ICs. FIG. 6 shows the actual connection in more detail. All of these integrated circuits we use in our current design have a communication channel known as a SPI bus. This is the bus by which the GNX communicates with the GNN integrated circuits. In FIG. 6 it shows the three lines that are part of the SPI bus shown as SCK 35 and MISO 34 and MOSI 33. Also there are three other lines which are labeled as SINTA 30 and as SINTB 31 and SINTC 32. These three lines are used by the GNX to select which GNN is talking to the GNX at any one time. This is a very conventional circuit by which microprocessors can communicate with each other. Later in FIG. 12 we will discuss the timing of the communication between the various integrated circuits.

Figure 7:
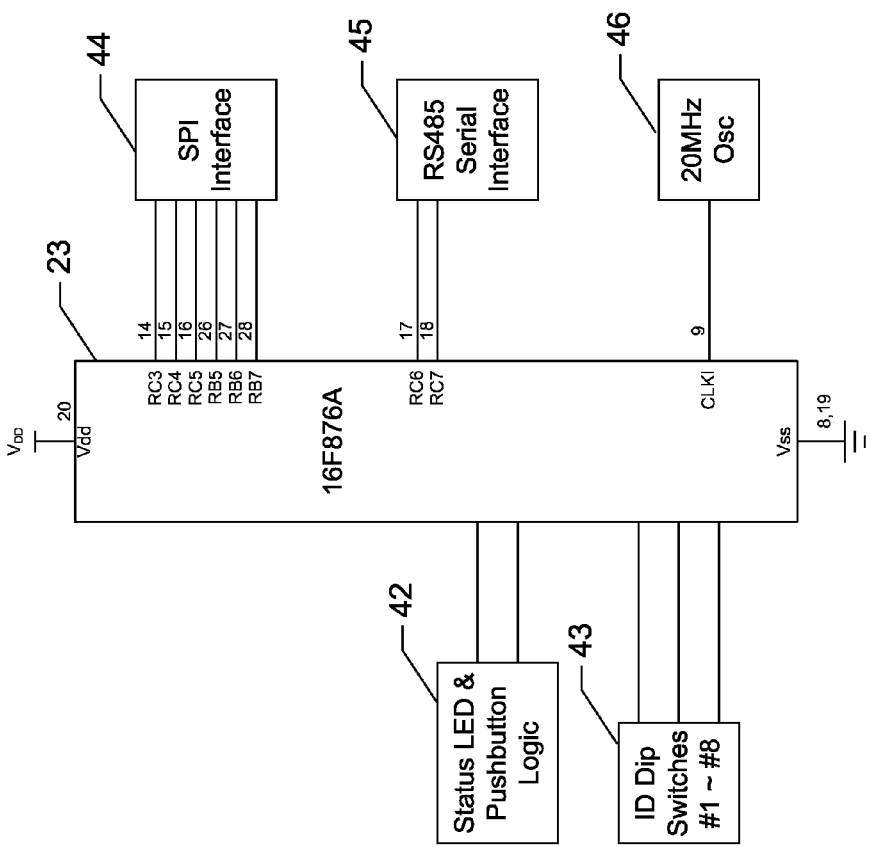
FIG. 7 is a diagram of an embodiment of a network extender integrated circuit of the present invention.

FIG. 7 Shows the Lighting Control System Described in the Current Application Network Extender (GNX) Chip.

FIG. 7 shows the various connections of the GNX 23 integrated circuit. In FIG. 5 the GNX is shown with only for basic lines of communication one of which goes to the GNC 20 integrated circuit by means of the isolation circuits 21 and 22. The other three lines are connected to the three GNN integrated circuits 26, 27 and 28, which in turn connect to the three phases of the powerline. FIG. 7 is a more detailed drawing of the connections to the GNX microprocessor. On the right side is shown the SPI interface 44 which is shown in FIG. 6 in more detail. Also on the right side is shown the RS485 45 interface which connects to the GNC integrated circuit 20.

Also on the right side shown the 20 MHz 46 oscillator which is a crystal which is used for the internal timing of the entire GNX integrated microprocessor. On the left side are shown connections to some LEDs 42 and a pushbutton switch 42 which are used for information and diagnostic purposes.

Also shown on the left side is a rotary DIP switch 43 which is labeled ID Dip switches #1~#8. In reality this dip switch is a Rotary switch that can produce the #s one through eight which are actually zero through seven in binary. This switch is the switch that is used to set the address of the GNX unit. Since there can be up to eight GNX units installed in a lighting control system described in the current application, each GNX must have a separate address from 1-8. The address switch is how the GNC integrated circuit will recognize which GNX it is speaking too. Later in FIG. 12 and FIG. 13 we will show how the GNX has a certain timing scheme where the GNX talks to the GNC in order of its address. GNX #1 initiates the communication and talks to the GNC first where GNX #s 2-8 follow in turn each speaking in order of their address #.

Figure 8:
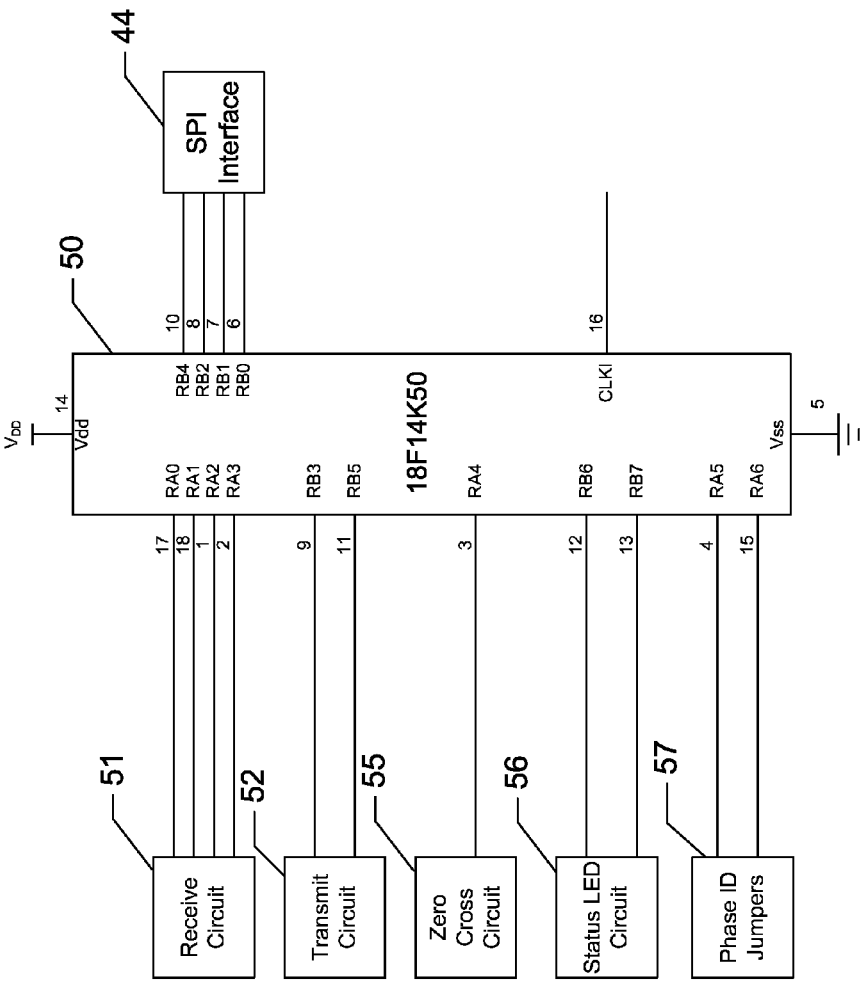
FIG. 8 is a diagram of an embodiment of a lighting control system network node of the present invention.

FIG. 8, Shows the Lighting Control System Described in the Current Application Network Node (GNN) IC.

FIG. 8 shows more detailed connections to the GNN integrated circuit 50. On the right side is shown the SPI interface 44 that connects to the GNX integrated circuit. On the left side are shown block diagrams of the various circuits connected to the GNN integrated circuit. First there is the receive circuit 51 which receives signals from the powerline and processes them into a form that can be received by the GNN integrated circuit. Second shown is the transmit circuit 52 which is used by the GNN integrated circuit to put the messages and pulses onto the powerline.

Next is shown the zero crossing circuit 55 which receives the AC signal and transforms it into a square wave so the GNN integrated circuit can establish timing related to the powerline cycles. Next is shown the LED circuit 56 which connects to one LED indicating the status and operation of the GNN for diagnostic purposes.

Next are shown phase ID jumpers 57 which tell each GNN which of the three possible sockets is on the circuit board is plugged into on the GNX. Each GNN is attached physically to a different phase of the powerline. These two inputs which are labeled in the block diagram phase ID jumpers 57 indicate to each GNN IC which position it is plugged into on the circuit board, Phase A or Phase B or Phase C. The firmware in every GNN chip is identical so the method that we use to indicate which GNN is connected to which phase, Phase A or Phase B or Phase C is determined by the phase jumpers. For example the jumpers to the two Phase A GNN ID Jumpers may be ground, ground or 00 in binary. For the Phase C GNN those two input pins and phase be may be binary 01 and Phase C GNN may be binary 10. The various combinations of the jumpers are permanently set on the circuit board so the GNN ICs know which powerline phase they are permanently connected to.

Figure 9:
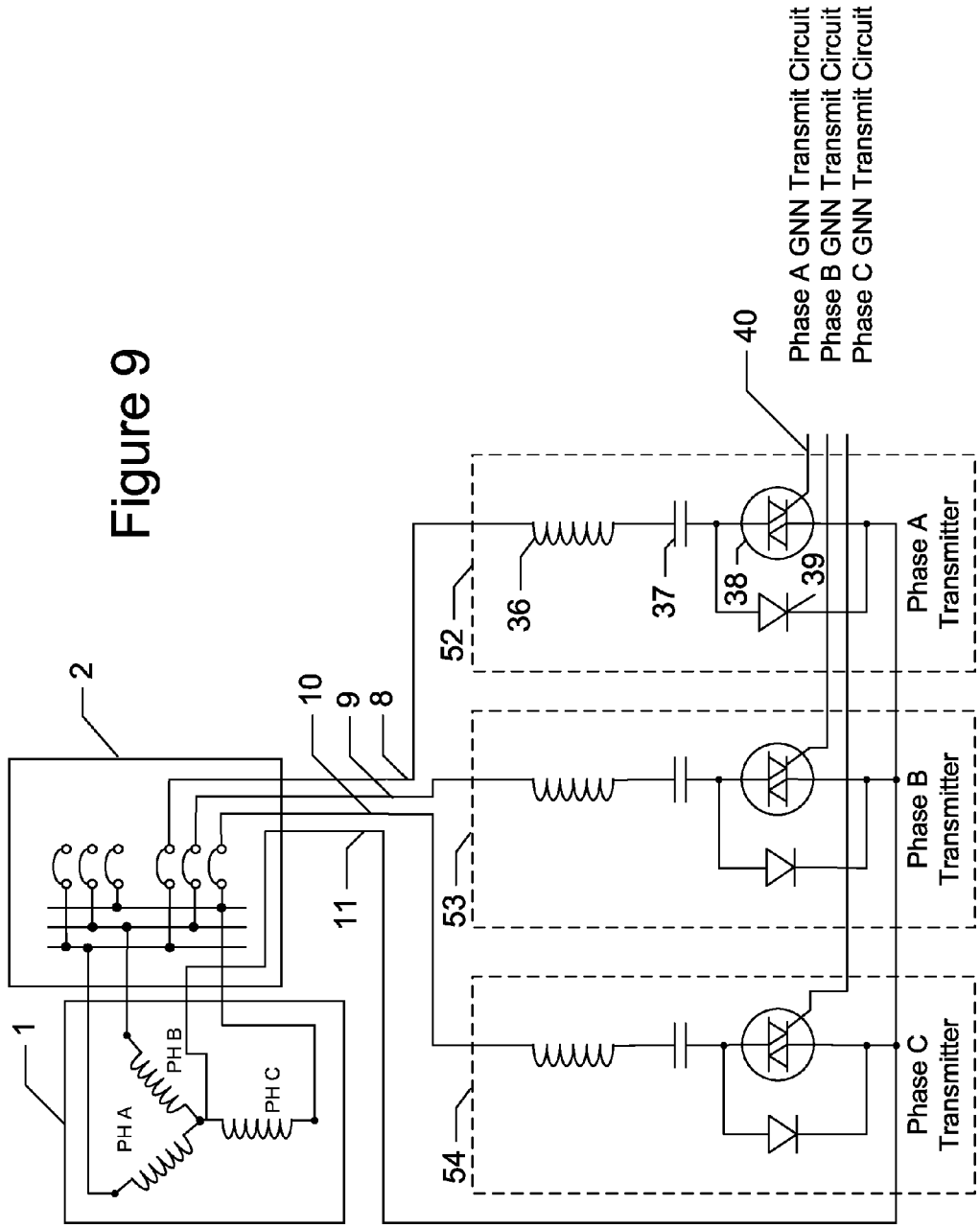
FIG. 9 is a transmit circuits diagram of an embodiment of the present invention.

FIG. 9 Shows the System Transmit Circuits

FIG. 9 shows the basic transmit circuits 52, 53, 54 of one GNX of the lighting control system described in the current application communication devices. This basic single phase transmit circuit 52 is the subject of previous patents filed by our company. In FIG. 9 we show the three transmit circuits 52, 53, 54 connected to the three phases 8, 9, 10 of a three phase power system supplied by the three phase transformer 1 through the three phase circuit breaker panel 2. The operation of the transmit circuit is well documented in the previous patents. To review the operation of the transmitter is very simple, using the Phase A transmitter 52 in FIG. 9 as an example.

Item 1 in FIG. 9 is the transformer. In FIG. 9 is the circuit breaker panel 2 which contains the three phases A 8, B 9, and C 10, and also the neutral 11. The phase A transmitter 52 receives its power from what is labeled item 8 in FIG. 9 which is the phase A line coming from the circuit breaker in the panel. The power from phase A charges capacitor labeled 37. At the correct time the signal 40 from the GNN circuit will trigger the triac that is labeled item 38, producing a pulse on the powerline. In FIG. 9 is a diode 39 which allows the capacitor 37 to charge up. The only purpose of this diode shown 39 is to charge the capacitor 37. Item 36 is an inductor in series with the entire line of charging and discharging of the capacitor. The purpose of this inductor 36 is to reduce high-frequency noise from discharging the capacitor and to slow down the discharge of the capacitor slightly to protect other components. The structure of the other two transmitters 53, 54 on phases B 9 and C 10 is identical only the timing is different.

Figure 10:
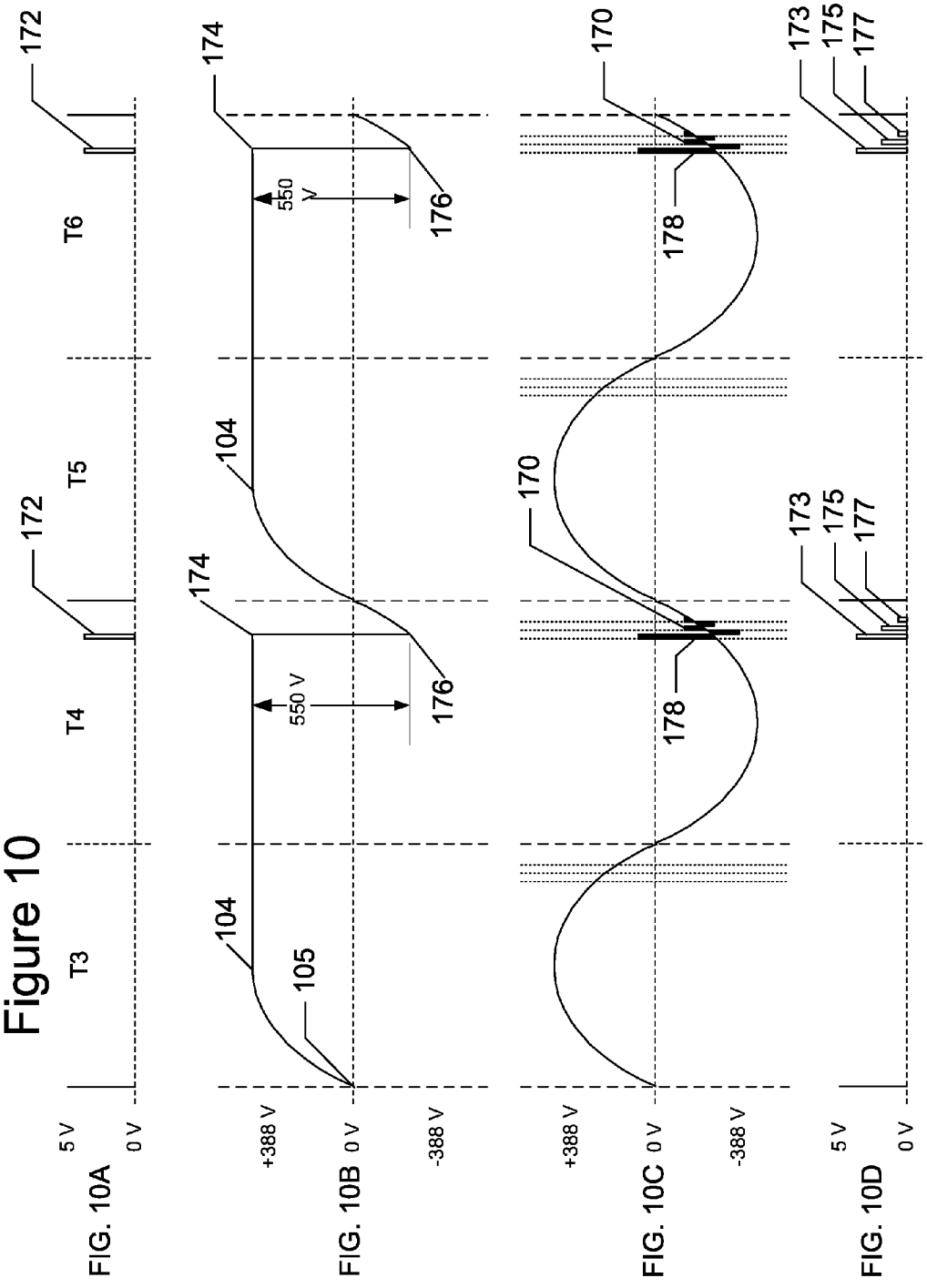
FIGS. 10A, 10B, 10C and 10D are single phase transmit timing diagrams of an embodiment of the present invention.

FIG. 10 Shows the Single Phase Transmit Timing Diagram

FIGS. 10A, 10B, 10C and 10D are powerline waveform diagrams showing the transmission circuit charging on the positive half cycles and discharging on the negative half cycles in the currently preferred embodiment of the invention order to produce the pulses used to make up the message. The transmitting circuit and operation used on each phase of the three phase transmitter in the current invention are thoroughly described in our previous patents.

FIG. 10 shows a diagram of the transmitter operation of the transmitters shown in FIG. 9. FIG. 10 shows the operation of only one of the three-phase transmitter's. The top of FIG. 10 shown as FIG. 10A shows the transmit signal 172 that would come from the GNN integrated circuit triggering the discharge of the capacitor. The transmit signal 172 from a GNN IC, shown in FIG. 10 A would be received by the triac and triggering the triac 38 in FIG. 9 to discharge the capacitor 37 in FIG. 9 into the powerline.

FIG. 10 B shows the voltage on the capacitor as it charges and discharges. In the beginning to the left a point shown as 105 the capacitor begins charging. It is charged through the rectifying diode 39 shown in FIG. 9. The capacitor charges to its full value by position 104 in FIG. 10 B. The capacitor remains charged until point 174. At this point the trigger signal 172 shown in FIG. 10 A triggers the triac and discharges the capacitor so that is now negatively charged that is shown as 176 in FIG. 10 B. At this point the capacitor charges again to a second 104 and the process is repeated until the next transmission shown to the right half of FIG. 10.

FIG. 10C shows a representation of the pulse that is produced on the powerline from the capacitor being discharged. This pulse is shown as 178. As the capacitor discharges it causes a ringing pulse that goes above and below the powerline for approximately 50 µs. The first pulse in the powerline is shown as #178 in FIG. 10C the second oscillation is shown as 170 and the third oscillation is shown as 174. The microprocessors used in the GNN can only receive positive pulses because the power supply only goes between 0V and 5V. In FIG. 10B the pulses are represented as they come into the processor receiving circuit. The first pulse in the ringing series of pulses is shown as item 173 the second pulses shown as 175 and the third ringing pulse shown is 177. These are all oscillations of the same discharge of the capacitor. The receiving circuit of a GNN decodes the pulse. This transmitting of pulses on a single phase of the powerline is the subject of previous patents of our company and is well documented and those patents.

Figure 11:
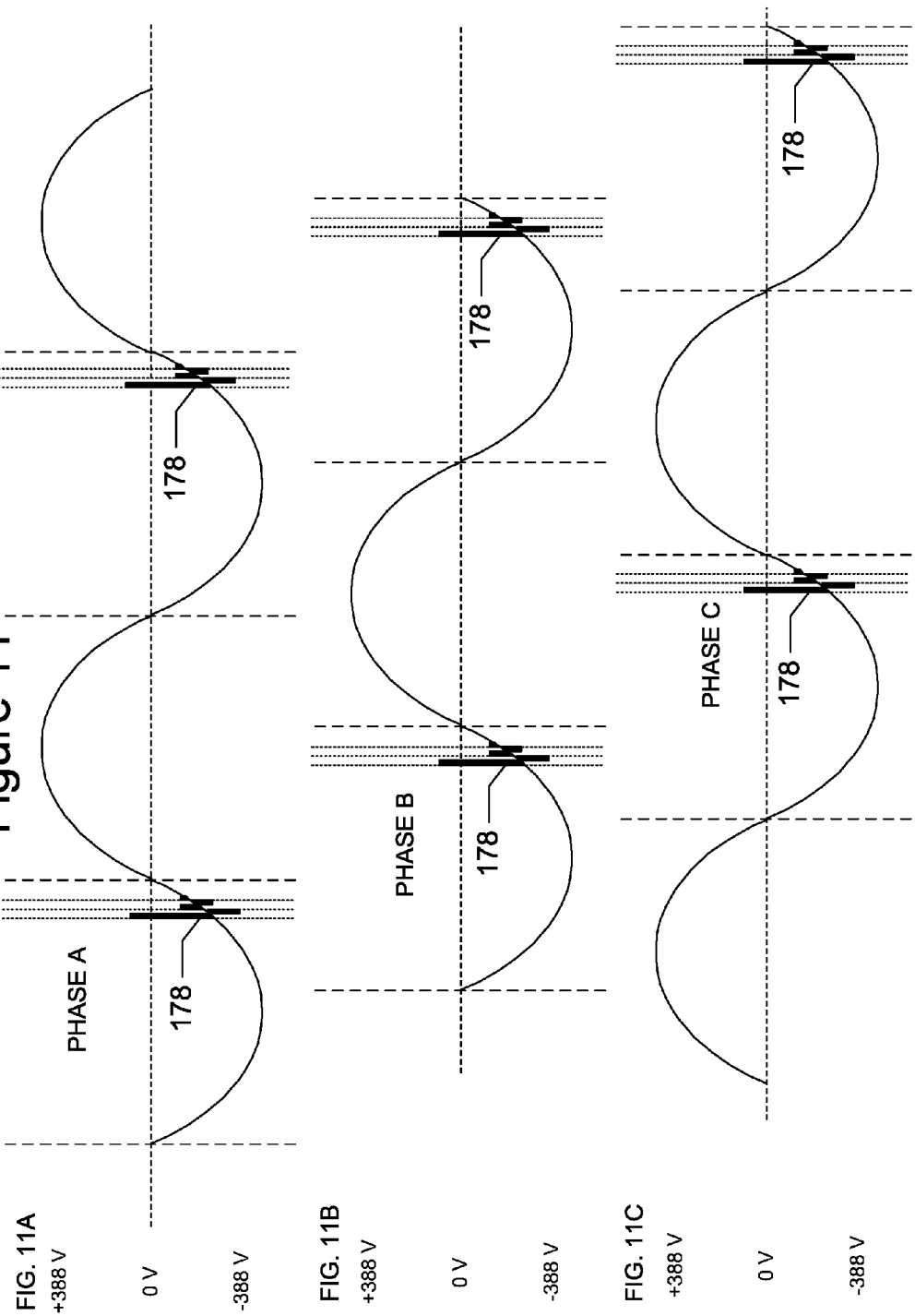
FIGS. 11A and 11B are powerline waveform diagrams showing the two of the possible sets of transmission positions employed by the current preferred embodiment of the invention to encode data into the position of the pulses.

FIG. 11, THREE PHASE TRANSMIT TIMING DIAGRAM, with FIGS. 11A, and 11B and 11C powerline waveform diagrams showing the three phases of transmission positions employed by the currently preferred embodiment of the invention to encode data into the position of the pulses.

FIG. 11 shows all three phases of the powerline. The three powerline cycles shown in FIG. 11 are identified as FIGS. 11A 11B and 11C. These cycles on all three-phase power lines are separated by 120°. The operation of each phase is identical except that each phase is shifted by 120°. Each pulse shown in FIG. 11 such as the ones identified as 178, can actually be placed in one and only one of two time positions. These two positions are separated by approximately 400 µs. If the pulse appears in the left position it represents a binary zero. If the pulse appears in the right position it represents a binary one. This concept is well documented the company's previous patents.

The key element of this current invention is that all transmissions from different GNX units in the system are synchronized. If we go back to FIG. 2 we can see that there are four GNX 3 units in this example system. When the GSC 6 commands the GSX 3 units to send the transmission message into the power system of the building each GSX 3 unit will place the same command onto the powerline starting on the same cycle. It is impossible to know how well the electrical coupling between two different circuit breaker panels will be. For example in FIG. 2 the four circuit breaker panels are shown identified as 2. There are also four GSX units shown, identified as 3. Each GSX is attached to each circuit breaker panel.

The top GSX unit attached to the top circuit breaker panel transmits commands made up of individual pulses which represent individual binary ones and binary zeros into the powerline and it may be such that the signals are coupled very well into circuit breaker panel 2 which is shown as the second circuit breaker panel down from the top of the page. Of course GSX number two which is directly attached to the second circuit breaker panel also is transmitting the same messages with the same pulses into circuit breaker panel 2. These two sets of transmission pulses will be mixed together when they reach a receiver module. In fact on FIG. 2 there are four GSX units shown and the pulses from all four GSX units will be mixed together arriving at any fixture control module. If any one of these GSX units is transmitting a pulse representing either a one or a zero and this transmission is different by even one power line cycle from the transmission from any other GNX, the messages will be destroyed.

It is the subject of this invention and critical to the reliability of this system that any system with multiple GSX units must have the transmissions from each GSX unit synchronized with all other GSX units. Each GSX unit must put the every binary one or binary zero that is part of the total digital message in the same powerline cycles exactly. If anyone of the GSX units is off by even one cycle the entire system will be unreliable and the messages will be destroyed. The concept of synchronization of transmitting pulses that appear approximately in the same time but exactly in the same cycle is the main point of this invention. The synchronization of all transmitters is the key to a reliable system using pulse position modulation with multiple transmitters.

The powerline pulse position transmission into a single phase is the subject of our previous patents. This invention is allows for a system that can communicate from multiple circuit breaker panels simultaneously without compromising the reliability of the system.

A further enhancement of the system is a more exact synchronization of the timing GSX units such that not only do they always transmit on the exact same cycle for each respective binary one or binary zero but also that the synchronization of the transmissions is more exact producing the pulses within several microseconds of each other thereby providing a more uniform and consistent mixing of pulses as they reach the various receivers in the system. It was found that if there are random variations of 10 or 20 µs between GSX transmissions the mixing of the pulses is such that the reception of the mixed pulses produces effective pulses that are not very uniform in nature which makes the reception somewhat more unreliable. If the transmissions from all GSX units are more carefully and more closely synchronized in time within a few microseconds it was found the mixing of the pulses is very consistent making it easier for receivers to properly decode the pulses into binary ones and binary zeros thereby producing a more reliable system. This enhancement of more exact synchronization produces an even more reliable system.

Figure 12:
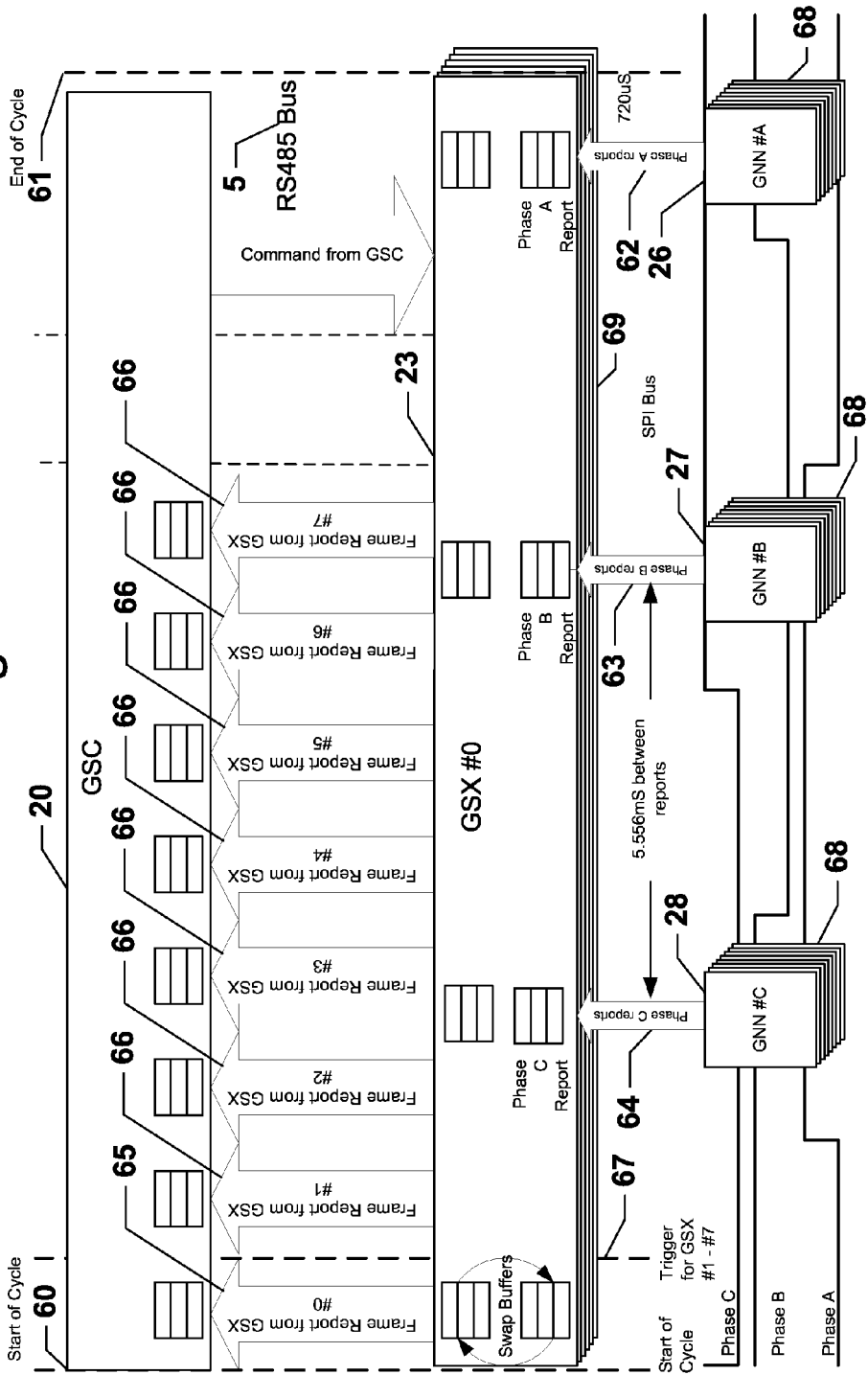
FIG. 12 is an upstream timing diagram for an embodiment of the present invention.

FIG. 12 Shows the GNC/GNX/GNN Upstream Timing Diagram

FIG. 12 is a timing diagram of the upstream communication starting from the GNN microprocessor 26, 27, 28 to the GSC 20 microprocessor. We will call this the upstream path of information flow since the information starts on the powerline phases A, B, and C and moves up the chain of ICs from the GNN ICs 26,27,28 and 64 to the GSX ICs 23, eventually reaching the main processor, the GSC 20. The GNN microprocessors receive and decode signals from the powerline. Each GNN microprocessor is connected to one phase of the powerline.

In FIG. 12 the three GNN microprocessors are labeled GNN#A 26, GNN#B 27, and GNN#C 28. FIG. 12 is a timing diagram that covers one full 60 hz cycle of the powerline. On the left side of FIG. 12 is the beginning of a powerline cycle 60 and on the right side of FIG. 12 is the end of the powerline cycle 61. During each powerline cycle the following communications occur. At the bottom of FIG. 12, for the GNN microprocessors, each GNN establishes its timing from the zero crossing of the powerline phase to which it is connected. Because the powerline phases for A, B, and C phases are different by 120° there are is approximately 5.5 ms timing between when each GNN microprocessor communicates with the GSX microprocessor 23 above it. Each GNN microprocessor initiates the communication messages called Phase Reports 62,63,64 with the GNX microprocessor 23 to which it is connected. We call these communications from the GNNs to the GSX Phase Reports 62,63,64. The GNX does not initiate any of the GNN communications 62,63,64. The entire timing cycle is initiated by the GNN ICs 26,27,28 which base the timing of their Phase Reports 62,63,64 relative to their respective Zero Crossing trigger times. On FIG. 8 the Zero Crossing input 55 is shown more clearly on the block diagram for the GNN IC 50.

At a certain point in time related to the zero crossing input time, each GNN microprocessor initiates communication with the GSX microprocessor. The way this is accomplished is that each GNN microprocessor toggles its polling pin, which is shown in FIG. 6 and identified as pin #s 26, 27 and 28 on the GNX units. As you can see from FIG. 12 a GNN Report 62,63,64 is passed from each GNN 26,27,28 microprocessor to the GSX microprocessor 23 one time during each powerline cycle. Note that in FIG. 12 there are shown seven other GSX ICs GSX#1-GSX#7 69 behind the front GSX#0 23. The first GSX#0 23 microprocessor compiles the information from all three GNN microprocessors below it into a single first Frame Report 65 and in turn passes that Frame Report 65 on the next powerline cycle to the GSC 20 microprocessor above it. In FIG. 12, for simplicity, we only show one GSX 23 microprocessor on the forefront. In a Lighting control system described in the current application there can be up to eight GSX microprocessors connected to up to eight circuit breaker panels and also connected to the same GSC 20 microprocessor. Only one GSX 23 is shown in the forefront. Again FIG. 12 only shows one GSX microprocessor in the front. The other possible seven GSX microprocessors 63 are shown hiding behind GSX#1 23 for simplicity.

The Frame Reports 65 and 66 for all 8 GNX units are shown in FIG. 12. The Phase A 62 and Phase B 63 and Phase C Reports 64 for all 32 GNN units are also shown in FIG. 12. Each of the background seven GSX#1-GSX#7 69 ICs is also connected to three GNN IC's 68. The background GNN ICs 68 are shown slightly behind the three front GNN ICs 26,27, 28 connected to GSX #0 23.

Above the GSX processor in FIG. 12 to the far left is shown a Frame Report 65 from GSX #0. This communication begins at the start of the cycle 60. This Frame Report from GSX #0 initiates the transmission of all following GSX Frame Reports 66 during the powerline cycle. In every lighting control system described in the current application there must be at least one GSX 23 which is always addressed as GSX#0. Otherwise there would be no communication and no control. There must be at least one circuit breaker panel connected to one GSX. That GSX 23 will be identified as GSX #0 in binary. All the following GSX units 69 which would be numbered #1 through #7 establish their timing based on listening on the RS485 bus 5 to the frame report 65 from GSX #0 23. The arrows pointing up 65,66 in the middle of FIG. 12 are communications that occur on the RS485 bus 5. The main controller of the system, the GSC microprocessor 20, receives Frame Report 65 from GSX #0 23 microprocessor and up to seven more Frame Reports 66 if the other seven GSX#1-GSX#7 microprocessors 63 exist in the system.

Figure 13:
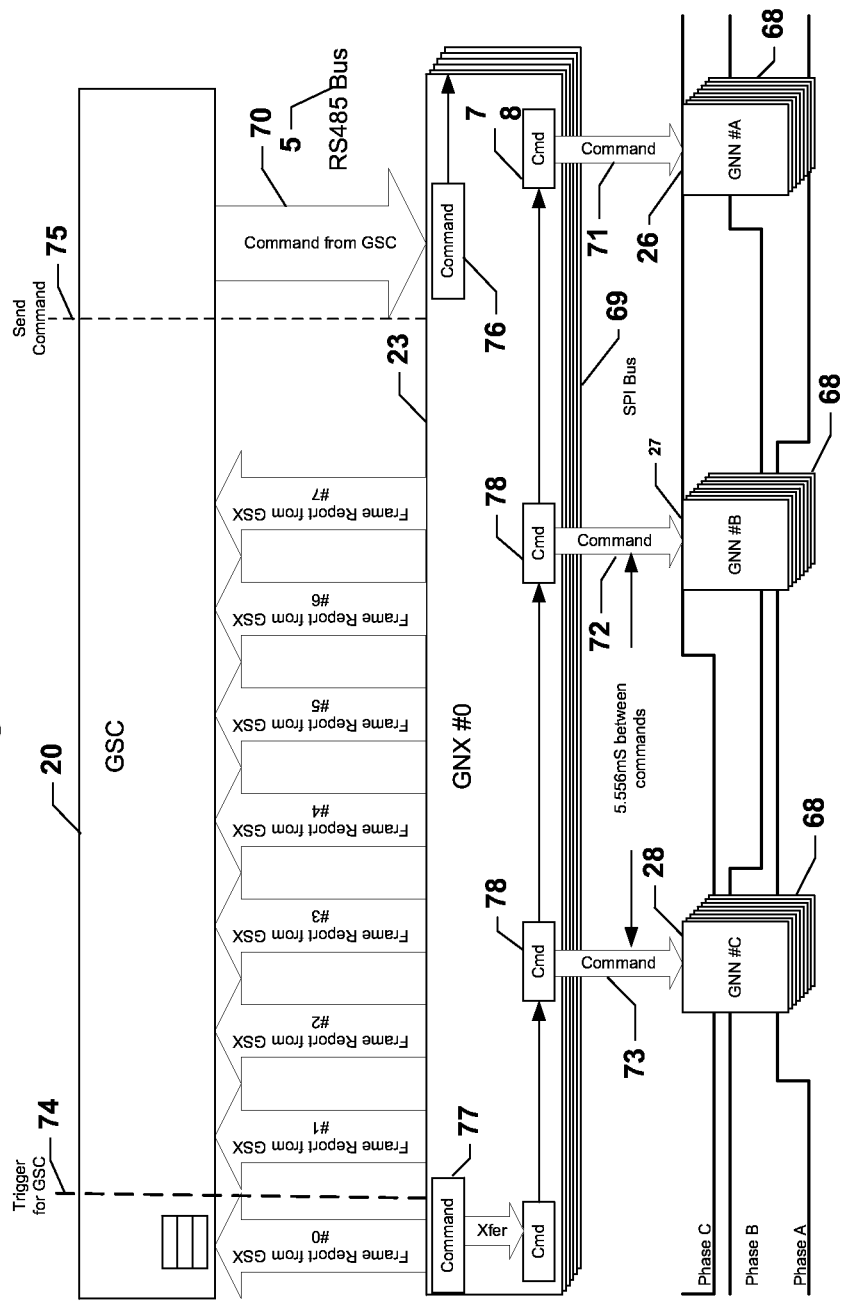
FIG. 13 is a downstream timing diagram for an embodiment of the present invention.

FIG. 13 Shows the GNC/GNX/GNN Downstream Timing Diagram

FIG. 13 illustrates the downstream commands starting from the GSC 20 microprocessor into the GNX 23 and 69 microprocessors and finally to the GNN 26,27,28 microprocessors. This FIG. 13 is very similar to FIG. 12 except it shows the downstream Command communication from GSC microprocessor to the GNX microprocessor and then to the GNN microprocessors. The final step is the GNN devices place the messages directly on the powerline phases where they are broadcast to all the fixture control modules.

Because this invention is concerned primarily with the synchronization of the transmission pulses on the powerline from all GNN 26,27,28 and 68 microprocessors this level of commands is the most important to be discussed in this invention. The command initiates from the GSC 20 microprocessor shown at the top of FIG. 13. There are many reasons the GSC 20 microprocessor may initiate a command that should be sent on the powerline.

A very simple case would be when there is a scheduled event such as a timed event that should turn the lights on or off at a certain time of day. For example at six in the morning before a factory opens the lights are to be turned on. There is a complex schedule resides inside of the GSC microprocessor. The GSC is also connected to a real-time clock. The GSC checks the real-time clock every minute. When the real-time clock indicates that the time is 8 AM then the GSC will send a command intended for the powerline to the GNX units that are connected to each phase and each circuit breaker panel within the system. The command sent to the GNX units is shown in FIG. 13 as an orange arrow to the far right labeled Command from GSC.

This command 70 is sent simultaneously to up to eight GNX units. For simplicity in FIG. 13 only one GNX 23 unit is shown in the front on the RS485 bus. The other possible 7 GSX units GSX#1-GSX#7, 69, if they exist are shown behind the number one GSX#0 23 processor. All existing GNX microprocessors receive the same downstream command 70 from the GSC microprocessor simultaneously. The GNX microprocessors store the GSX Command 76 and later on the next powerline cycle distribute stored Node Command 77 as the individual GNN Node Commands 78, 71,72,73 to each of their three Phase A GNN 26, and Phase B GNN 27 and Phase C GNN 28 microprocessors.

The GNX microprocessor only transmits the command to the GNN microprocessor at the time the GNN microprocessors initiate communication with the GNX microprocessor. Each GNN microprocessor stores the command to be transmitted on the powerline until the next powerline cycle. On the following cycle each GNN, at the appropriate time in that GNN's cycle, about 2 msec before the rising zero crossing point, begins transmitting the command into the powerline. The GNN microprocessors will take the command from the GNX microprocessor and control the entire communication into the powerline in terms of building a command of zeros and ones and placing the binary pulses onto the powerline in the appropriate cycles.

The command is received from the GSC microprocessor into the GNX microprocessor in one cycle the command is also relayed from the GNX microprocessor to the GNN microprocessors in one cycle, but the GNN microprocessors may take several hundred powerline cycles to actually place the entire command into the powerline network. Only one pulse representing one binary bit is placed on the powerline every cycle. The important aspect of this invention is that the entire GNC, GCX, GNN system is arranged and programmed such that the set of binary pulses put onto the powerlines by all the GNN microprocessors are carefully set up so that they will always place said pulses onto the powerlines at the same time. This synchronization takes priority over any and all other functions these processors are performing.

Once again the main subject of this invention is the concept that all GNN microprocessors connected to GNX microprocessors must be synchronized such that the pulses representing binary ones and binary zeros must be synchronized. Each of the possible eight Phase A GNN microprocessors 26, 68 transmits the same binary one or binary zero in a message on the exact same cycle. This is also true for the Phase B and Phase C GNN transmissions.

If there were is any mechanism by which any GNN connected to any GNX could be off by even one powerline cycle the system would be very unreliable and the resulting messages would be scrambled. The synchronization of transmitted pulses from multiple GNX units installed on multiple circuit breaker panels is the main subject of this invention.

FIG. 14 Shows the GNX/GNN SPI Timing Diagram.

FIG. 14 is a timing diagram of the SPI bus between the GNX microprocessor and the three GNN microprocessors. FIG. 14A 80 shows the communication on the SPI bus and the three GNN microprocessors. FIG. 14A represents one full cycle 81 of the AC powerline. Also shown is the timing of the RS485 bus 82, 83. This is for a reference. The RS485 bus shows the downstream communication 82 and the upstream communication 83 between the GNC microprocessor and up to eight GNX microprocessors over one powerline cycle. Also shown in FIG. 14 A is the SPI bus 84 where one of the eight possible GNX microprocessors is shown communicating with the three GNN microprocessors 85, 86, 87.

FIG. 14B 88 is a more detailed timing diagram of the SPI bus timing 84 shown in FIG. 14A. What is shown in FIG. 14B is the timing signals for the communication between one GNX microprocessor and one GNN microprocessors. FIG. 14B is an expansion of one of the GNN blocks 85 shown in the bottom part of FIG. 14A 85. FIG. 14B shows the SPI bus communication where one GNN is communicating with the GNX is using the SPI protocol which allows communication into two different lines labeled MOSI and MISO simultaneously. The SPI Bus communication is very standardized and well known to any electronics engineer in our industry. When the GNX is communicating with the GNN which is initiated by the GNN, 26 bytes 89 of information are passed simultaneously in both directions.

The upstream information going from the GNN to the GNX is information containing what the GNN has received from the powerline on the previous cycle.

The downstream information from the GNX to the GNN contains the command that originated in the GNC microprocessor and is being passed in turn on the GNX to the GNN. This command may be a powerline command or a command to reregister within the GNN or a variety of other commands or even a null command if there is no information to be transmitted.

The purpose of FIGS. 14A and 14B is to illustrate the method of communication on the SPI bus between the GNX in the GNN microprocessors. The SPI bus communication is a well-established protocol used in thousands of integrated circuits. The main point here is that the SPI protocol is used as a communication method between the GNN microprocessors and the GNX microprocessor on all of the GNX extender units.

Figure 15:
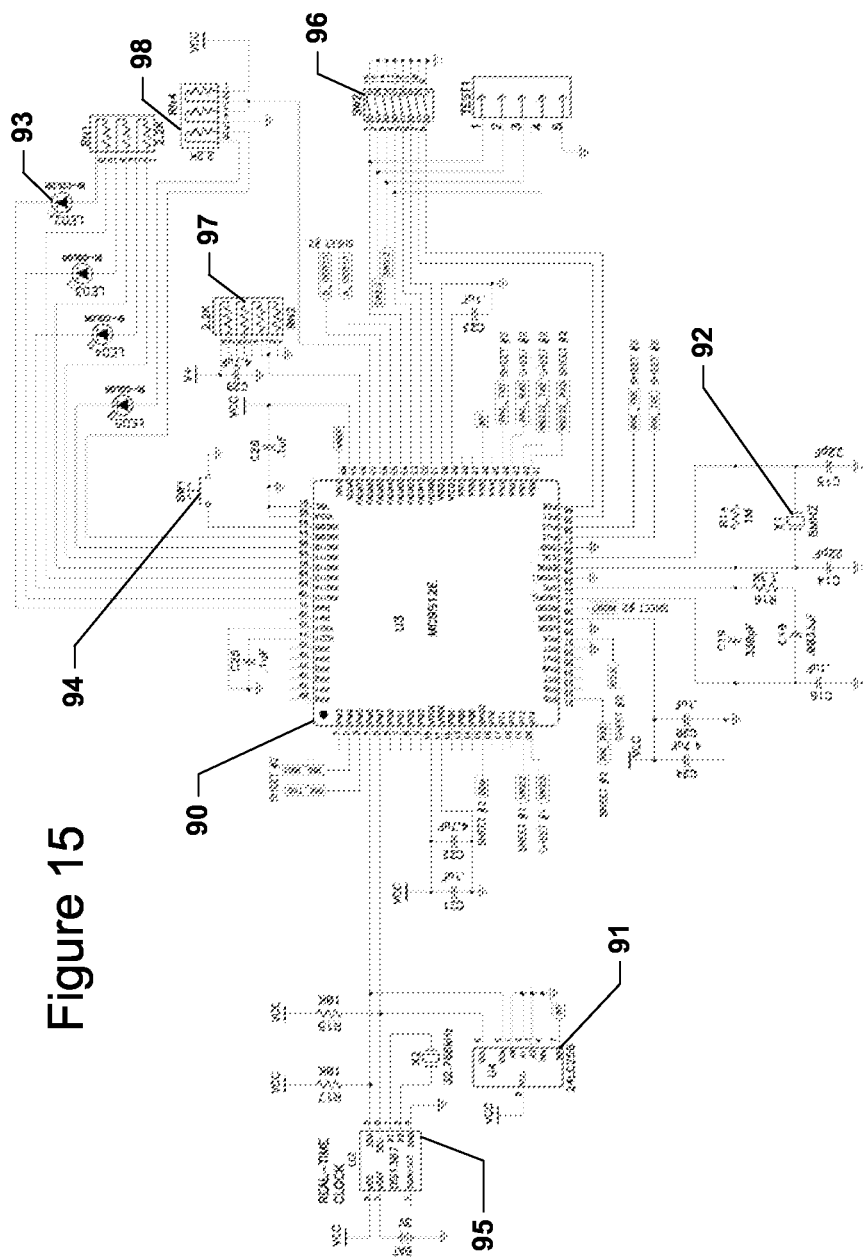
FIG. 15 is a partial schematic electrical diagram of a preferred main processor circuit board of a network controller embodiment of the present invention.
Figure 16:
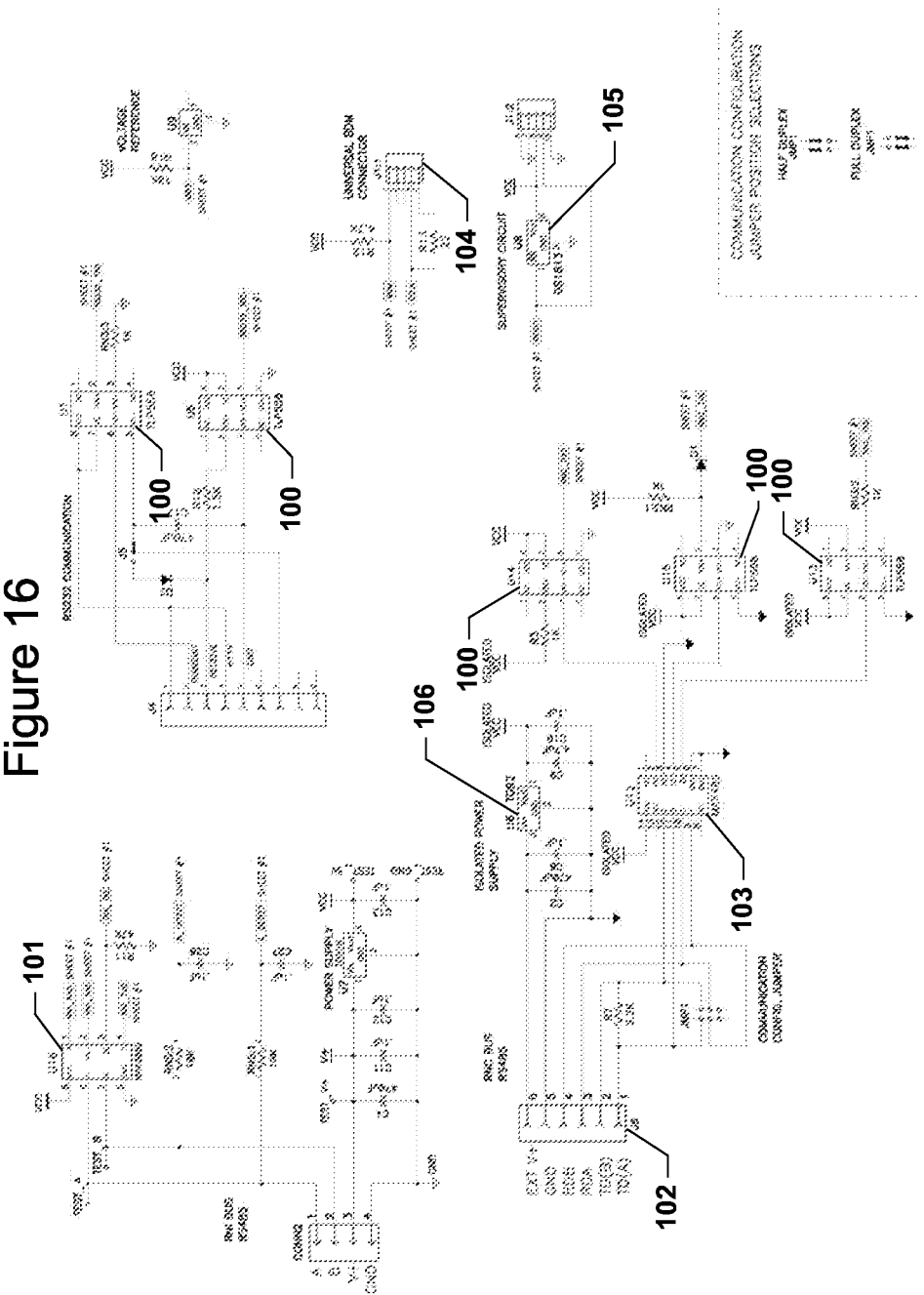
FIG. 16 is a partial schematic electrical diagram of an embodiment of the main processor accessory circuits of the present invention.

FIGS. 15 and 16 GSC SCHEMATICS

FIG. 15 and FIG. 16 are electrical schematics of the GSC circuit board. The circuit board contains the main GNC microprocessor 90 which is a Motorola MC9S12E microprocessor. This design is very straightforward and should be clear to anyone familiar in this field. The main component is the microprocessor 90 which is surrounded by auxiliary circuits and components such as the crystal oscillating circuit 92, which include an external double EEPROM memory shown as U4 91, a real-time clock shown as U2 95, a set of four LEDs 93 to indicate status of various functions, a set of eight dip switches 96 to be used for optional inputs, and a set of resistor networks shown as RN2 97 and RN4 98 which are voltage dividers that are used so the microprocessor can measure both the 5 V and 12 V power supply voltages. There is one switch labeled SW1 94 which is used as a general-purpose input pushbutton switch which can be used for various functions.

FIG. 16, is Part 2 of the schematic electrical diagram of the main processor accessory circuits of the Network Controller (RNC) of the pulse position modulated communication three-phase transmitter apparatus in accordance with this invention.

FIG. 16 is an extension of the schematic of the main GNC processor and shows very straightforward isolation circuits 100 that are used for the RS232 serial communication which allows the GNC microprocessor to communicate with the computer and the RS485 bus circuits 101, 102, 103 that allow the GNC microprocessor to communicate with the GNX microprocessors. FIG. 16 which is sheet 2 of the GNC schematic also shows the power supply voltage regulator for the 5 V power supply 106. Also shown is the connection to the Motorola development system which is labeled Universal BOM connector 104. There is also a supervisory circuit 105 which is a standard circuit which resets the processor if the voltage becomes too low. Once again these circuits are well known to anyone skilled in this industry and should be obvious in both the design the use of these circuits.

Figure 17:
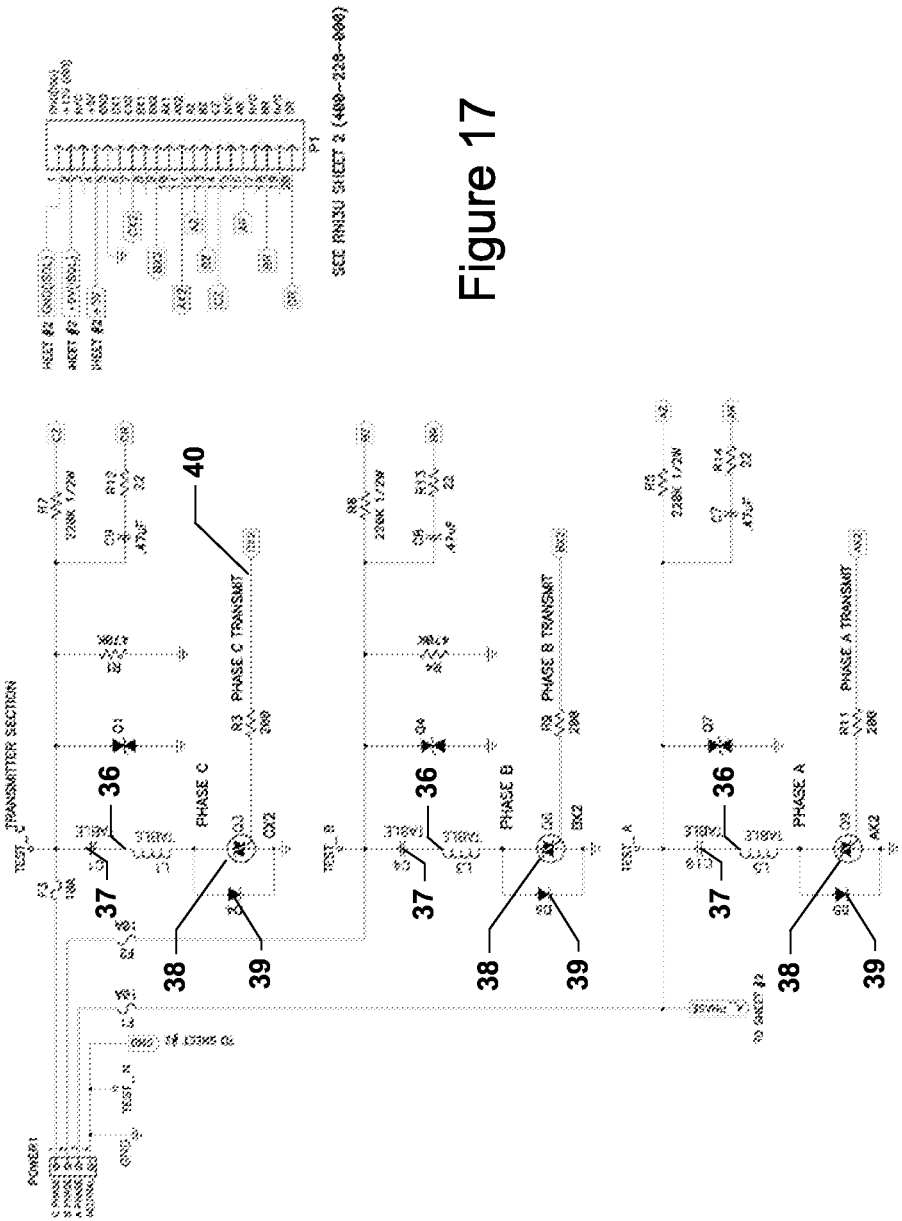
FIG. 17 is a partial schematic electrical diagram of a repeater network interface lower circuit board embodiment of one of two interconnected circuit boards.

FIG. 17, is Part 1 of the schematic electrical diagrams of the GSX lower circuit board that is one of the two interconnected circuit boards that make up part of the pulse position modulated three-phase transmitter apparatus in accordance with this invention. This drawing shows the three transmitters for the three phases.

FIGS. 17, 18, 19, 20 the GSX/GNN Schematics

FIGS. 17, 18, 19, and 20 make up the schematics for the device referred to as the GSX in the lighting control system described in the current application. The GSX is made up of two circuit boards. The GSX effectively allows communication between the GNC microprocessor and all three phase powerline circuits on one circuit breaker panel. FIG. 17, is the first figure of the schematic electrical diagrams of the GNX lower circuit board that is one of the two interconnected circuit boards that make up part of the pulse position modulated three-phase transmitter apparatus in accordance with this invention. This drawing shows the three transmitters for the three phases. On FIG. 17 is shown part of the lower circuit board of the GSX which contains the three transmitting circuits for the three powerline phases. The transmitting circuits shown in FIG. 17 are described in our previous patents very thoroughly. The various components 36, 37, 38, 39, 40 in FIG. 17 are also shown and described in detail in FIG. 9. The rest of the minor components such as resistors and capacitors, shown on FIG. 17 are very straightforward and will be familiar to anyone skilled in the design of electronics used in our industry.

Figure 18:
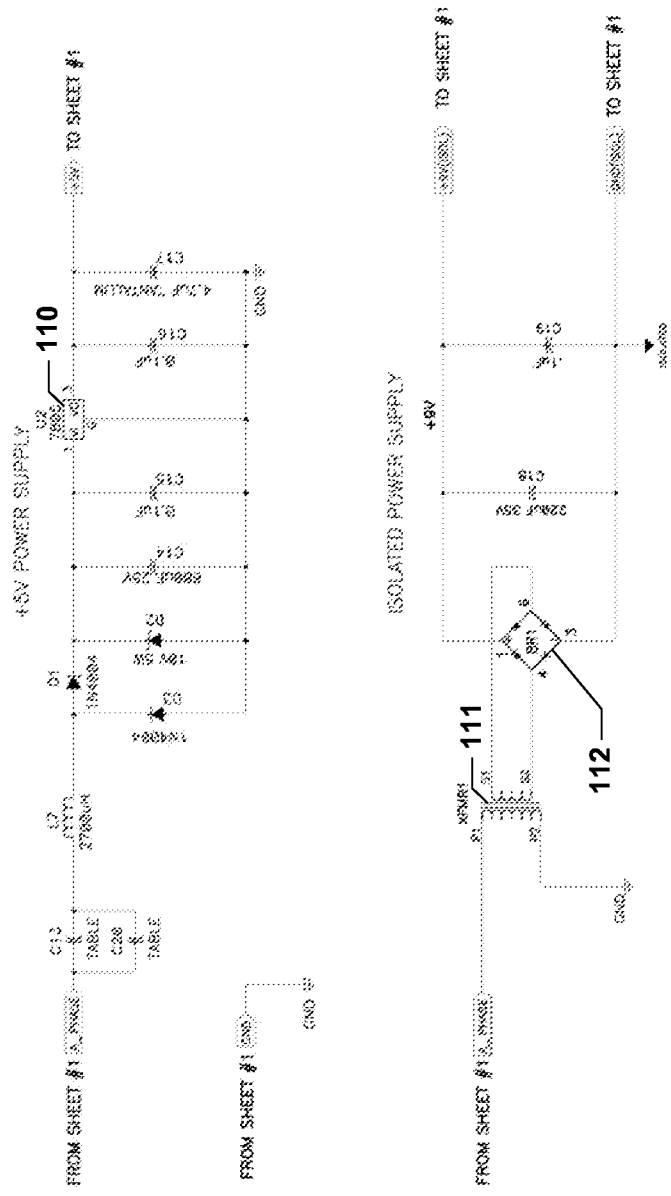
FIG. 18 is a partial schematic electrical diagram of power supply circuit embodiments of the present invention.

FIG. 18, labeled POWER SUPPLIES, is Part 2 of the schematic electrical diagrams of the GSX and shows the power supply circuits that make up part of the pulse position modulated three-phase transmitter apparatus in accordance with this invention. One power supply is a 5V non-isolated power supply 110 and one is a 9 V isolated power supply 112 which is isolated and powered by a transformer 111. These circuits are very straightforward and will be familiar to anyone skilled in the design of electronics used in our industry.

Figure 19:
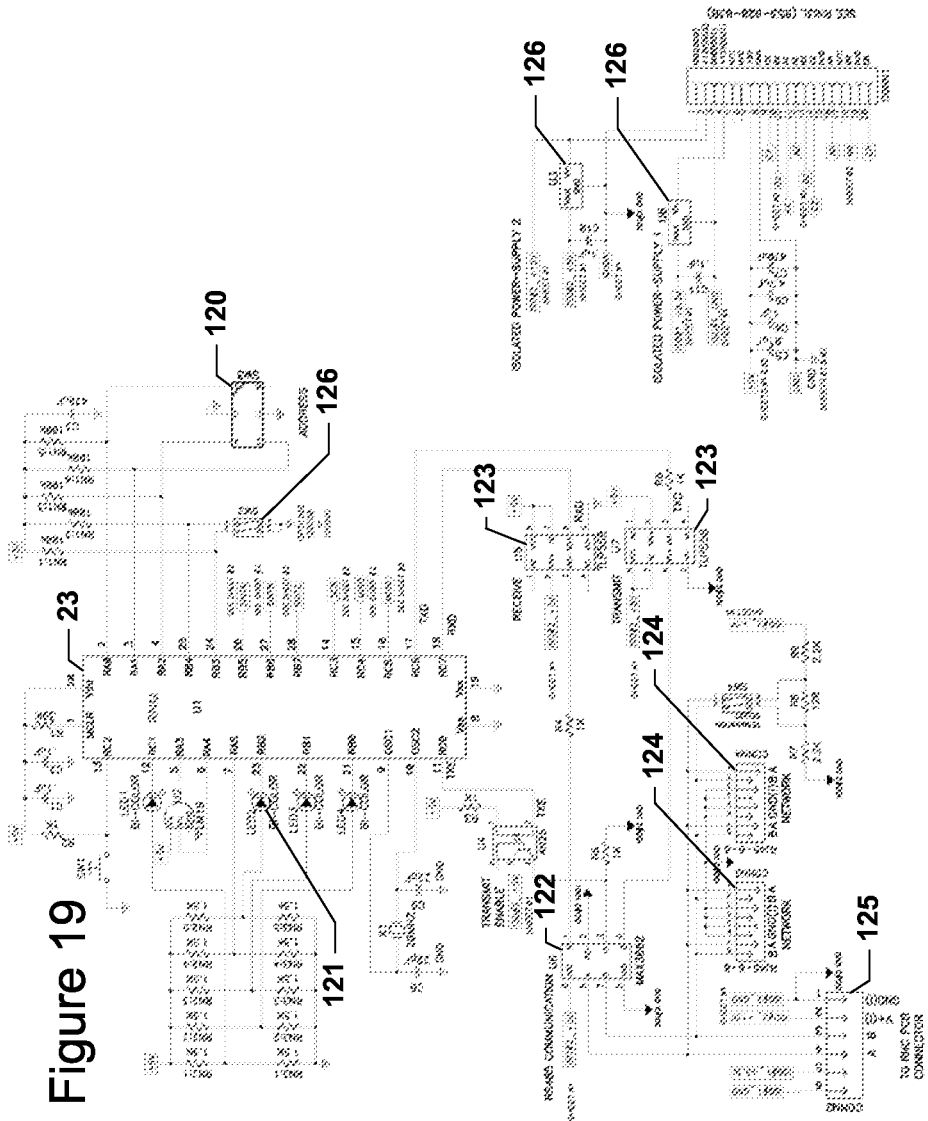
FIG. 19 is a partial schematic electrical diagram of a repeater network interface upper circuit board embodiment of one of two interconnected circuit boards of the present invention.

FIG. 19, is Part 1 of the schematic electrical diagrams of the GSX, upper circuit board that is one of the two interconnected circuit boards that make up part of the pulse position modulated three-phase transmitter apparatus in accordance with this invention. This drawing shows the GNX IC 23 and associated circuitry. There are four LEDs 121 that are used to indicate status information to the users. There is a binary switch 120 that is used to set the address of the GNX to 0-7 so the GSC can distinguish which of the possible eight GSX units it is receiving communication from. There is a small two position dip switch 126 used to set various options. There is a special RS485 IC 122 dedicated to managing the RS485 bus signals. There are RS485 bus isolation circuits 123 and connectors 124, 125 that enable communication between the GSX and the GSC and other GSX devices. There are two power supplies 126 that provide power for the GSC through connector 125.

Figure 20:
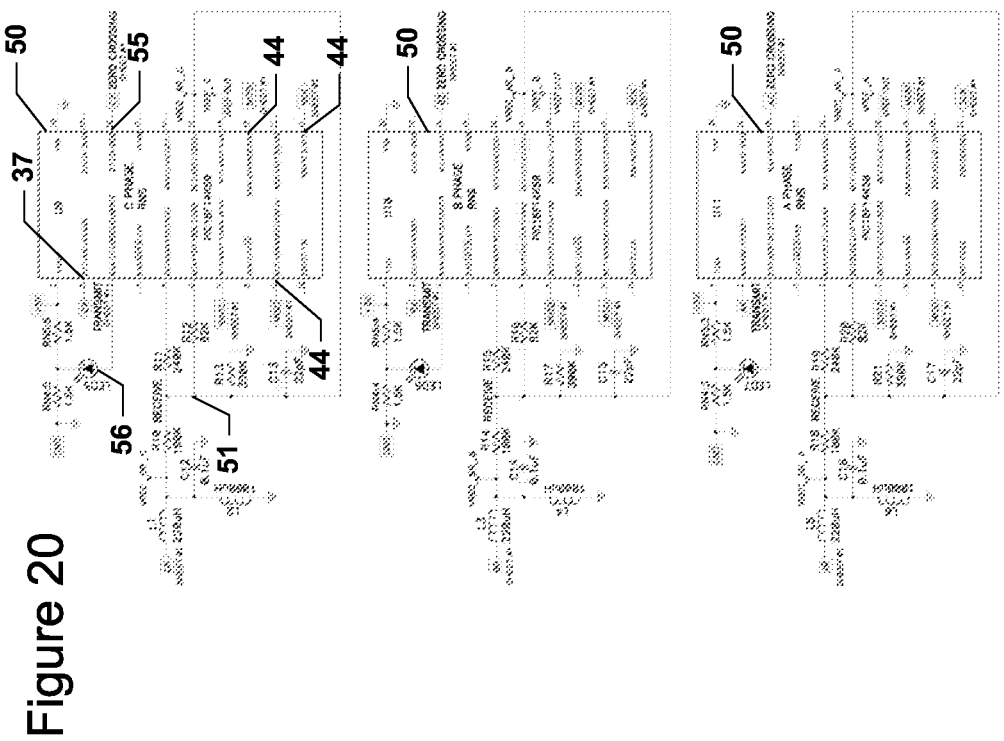
FIG. 20 is a partial schematic electrical diagram of a repeater network interface upper circuit board embodiment of one of two interconnected circuit boards of the present invention.

FIG. 20 shows the schematic electrical diagrams of the three GNN ICs 50, and illustrates the upper circuit board that is one of the two interconnected circuit boards that make up part of the pulse position modulated three-phase transmitter apparatus in accordance with this invention. This drawing FIG. 20 shows the three GNN ICs 50 that are connected to the GNX IC 23 and associated circuitry on FIG. 19.

FIGS. 19 and 20 show the circuitry contained on the upper circuit board of the GSX product. The upper circuit board contains the GNX microprocessor and the three GNN microprocessors. The purpose and operation of these microprocessors is been described thoroughly in previous sections. FIGS. 19 in 20 show not only the for microprocessors but also associated RS485 bus isolation circuitry, a crystal oscillator, various status LEDs, the main address switch that sets the address of each GNX unit, which is labeled SW3, and also the three receiving circuits, one connected to each GNN microprocessor 50, for each of the three phases A, B, and C of the powerline. The different parts of the GNN circuitry 37,50,44, 55,56 have been shown and described in FIGS. 7, 8 and 9.

Overview of Three Phase Transmitter Operation

One way to describe the operation of the Three Phase Transmitter is to follow the path of a command from the origination in the main control processor to the final destination which is the placement of the command onto the powerline so that it will be received by the Fixture Control Modules that are installed in every lighting fixture that needs to be controlled.

A command initially comes from some conditional logic inside of the main microprocessor, which we currently have named the GreenWorx Network Controller, (GNC) a Motorola MC9S12E. One typical scenario is that there is a timed event that is supposed to turn on the lights in a particular zone at 8 PM. The main processor is constantly checking a table, once each minute, of timed events against a real time clock to see if any commands are scheduled to be executed.

When the time scheduled equals the time in the real time clock the main processor decides to transmit the command. The main processor sends the command over the RS485 bus to the next lower level of processors, which we currently have named the GreenWorx Network Extenders (GNX), which are Microchip PIC16F876A processors. In the current design up to eight GNX processors can receive commands from the GNC simultaneously.

Each GNX processor relays the command to three Network Nodes (GNN), which are Microchip PIC18F14K50 processors. The GNN microprocessors are the ICs that actually place the commands on the powerline. Each of the three GNN ICs is connected to one phase of the three phase power system.

In this invention the design of a lighting control system described in the current application powerline communication system dictates that one lighting control system described in the current application Extender (GSX) be connected to every circuit breaker panel to which loads are to be controlled. It is very common in the case of industrial lighting systems that the lighting fixtures to be controlled are connected to several lighting circuit breaker panels. It was found that the transmissions from one three phase transmitter (GSX) located on one lighting circuit breaker panel will not effectively reach the fixtures on another lighting circuit breaker panel unless there is a second transmitter (GSX) installed on that second lighting circuit breaker panel. Sometimes transmissions from one GSX will proliferate through several lighting circuit breaker panels but sometimes it will not. It was found that in order to insure reliability we must install one GSX on every lighting circuit breaker panel that connects to fixtures that need to be controlled.

Because we can never know in advance how well the transmissions will be coupled between two or more lighting circuit breaker panels, the transmissions from ALL GSX units must be completely synchronized. If any transmitted pulses are off synchronization by just one powerline cycle the entire message can be destroyed and result in extremely poor reliability. The synchronization of all GSX units and their transmitted pulses is the main subject of this invention. Properly synchronized transmissions from multiple GSX units located on multiple lighting circuit breaker panels results in an extremely reliable powerline communication system.

To rely on transmissions from just one GSX in an industrial environment results in an unreliable system. To rely on a system with multiple GSXs that are not synchronized also results in an unreliable system.

To rely on multiple GSX transmitters that take turns transmitting our type of pulse method and protocol is far too slow.

The solution is our current invention, synchronized transmissions from multiple transmitters, one installed on each lighting circuit breaker panel.

The actual pulses from every GNN on the same phase must occur on the same powerline cycle at effectively the same time.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A powerline pulse position modulated communication transmitting system comprising:
    a three-phase electrical power system consisting of electrical power supplied by one or more power transformer with three phases; and
    said transformers of a Y type with three phase connections and a neutral connection or a Delta type with three phase connections and no neutral connection; and
    said transformers supplying power to loads to be controlled by said powerline pulse position modulated communication transmitting system; and
    said loads connected to said transformer or transformers through two or more circuit breaker panels; and two or more transmitting devices each with connections to one or more powerline phases of each of said circuit breaker panels of said three-phase electrical power system; and each of said transmitters each incorporating electrical circuits to produce communication transmission pulses on said one or more phases of said three-phase electrical power system;

at least two or more of said transmission pulses representing digital data; and each of said transmitters synchronized to produce said communication transmission pulses where said pulses produced on the same phase of said powerline are synchronized so that said pulses representing the same data are generated on the same powerline cycles at the same time.

2. The system of claim 1 wherein said connections to one or more powerline phases of said powerline of claim 1 where said connection includes a connection to both said phase and the neutral of said power system.

3. The system of claim 1 wherein said connections to said one or more powerline phases of said powerline of claim 1 where said connection includes a connection across two of said phases with no connection to neutral of said power system neutral.

4. The system of claim 1 wherein the two or more said transmitters of claim 1 establishing synchronized pulse transmissions by means of communication between the two or more said transmitters by means of a hard-wired connection between the two or more said transmitters.

5. The system of claim 1 wherein the two or more said transmitters of claim 1 establishing synchronized pulse transmissions by means of communication between the two or more said transmitters by means of a wireless connection between the two or more said transmitters.

6. The system of claim 1 wherein the two or more said transmitters of claim 1 establishing synchronized pulse transmissions by means of communication between the two or more said transmitters by means of a powerline connection between the two or more said transmitters.

7. A communication system comprising:
a three-phase electrical power system consisting of electrical power supplied by one or more power transformers with three phases;
said one or more transformers of a Y type with three phase connections and a neutral connection or a Delta type with three phase connections and no neutral connection;
said one or more transformers supplying power to two or more loads;
said two or more loads connected to said transformer or transformers through two or more circuit breaker panels;
two or more transmitting devices;
each of said transmitting device with connections to one of said circuit breaker panels;
each of said transmitters each incorporating electrical circuits to produce communication transmission pulses on said one or more phases of said three-phase electrical power system;
at least two of said transmission pulses representing digital data; and
each of said transmitters synchronized to produce said pulses where said pulses from said transmitters are generated on the same powerline at effectively the same time and on the same cycles.

8. The system of claim 7 wherein said connections to said circuit breaker panels of claim 1 includes a connection to both said phase and the neutral of said power system.

9. The system of claim 7 wherein said connections to said circuit breaker panels of claim 1 includes a connection to two of said phases with no connection to said power system neutral.

10. The system of claim 7 wherein the two or more said transmitters of claim 1 establishing synchronized pulse transmissions by means of communication between the two or more said transmitters by means of a hard-wired connection between the two or more said transmitters.

11. The system of claim 7 wherein the two or more said transmitters of claim 1 establishing synchronized pulse transmissions by means of communication between the two or more said transmitters by means of a wireless connection between the two or more said transmitters.

12. The system of claim 7 wherein the two or more said transmitters of claim 1 establishing synchronized pulse transmissions by means of communication between the two or more said transmitters by means of a powerline connection between the two or more said transmitters.

13. A method of transmitting digital data through a power system comprising:
providing a power system having power provided by one or more three phase transformers;
providing one or more circuit breaker panels connected to said each of said transformers;
providing a plurality of power circuits each having a wave form of a plain sine wave with repeating, alternating positive and negative half-cycle waves connected to said circuit breaker panels;
providing two or more transmitting devices each connected to one or more of said phases of two or more of said circuit breaker panels;
providing said transmitting devices capable of transmitting through the said power circuits a plurality of electrical pulses representative of said digital data, and,
providing said transmitting devices means such that said electrical pulses representing digital data are synchronized in time such that they are produced at effectively the same time on the same powerline cycles on the same phases.

14. A method of connecting said transmitting devices to each other in claim 13 by hard wired means to enable said synchronization.

15. A method of connecting said transmitting devices to each other in claim 13 by wireless radio frequency means to enable said synchronization.

16. A method of connecting said transmitting devices to each other in claim 13 by powerline communications means to enable said synchronization.

* * * * *